United States Patent
Chiu et al.

(10) Patent No.: US 11,143,809 B2
(45) Date of Patent: *Oct. 12, 2021

(54) BACKLIGHT MODULE WITH LIGHT GUIDE HAVING GROUPS AND MICROSTRUCTURES CONNECTING ADJACENT PRISMS

(71) Applicant: Darwin Precisions Corporation, Hsinchu County (TW)

(72) Inventors: Yu-Huan Chiu, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/090,217

(22) Filed: Nov. 5, 2020

(65) Prior Publication Data

US 2021/0063629 A1    Mar. 4, 2021

Related U.S. Application Data

(63) Continuation-in-part of application No. 16/737,102, filed on Jan. 8, 2020, now Pat. No. 10,859,751.

(30) Foreign Application Priority Data

Aug. 30, 2019    (TW) .................................. 108131425

(51) Int. Cl.
*F21V 8/00*    (2006.01)

(52) U.S. Cl.
CPC .................................. *G02B 6/0036* (2013.01)

(58) Field of Classification Search
CPC ... G02B 6/0036; G02B 6/0038; G02B 6/0061
See application file for complete search history.

(56) References Cited

U.S. PATENT DOCUMENTS 7,833,621 B2    11/2010    Jones et al.
8,186,867 B2    5/2012    Chen et al.
(Continued)

FOREIGN PATENT DOCUMENTS

CN    106501895 A    3/2017
TW    561089    11/2003
(Continued)

*Primary Examiner* — Robert J May
(74) *Attorney, Agent, or Firm* — WPAT, PC

(57) ABSTRACT

A backlight module including a plurality of first light-emitting devices and a light guide plate is provided. The light guide plate has a light-emitting surface, a bottom surface, and a first light-receiving side. The first light-receiving side connects the light-emitting surface and the bottom surface, and the light-emitting devices are disposed on the first light-receiving side along a first direction. The light guide plate further includes a plurality of prisms and a plurality of microstructure groups. The prisms are disposed on the bottom surface. The microstructure groups include microstructures, and the microstructures respectively connect two of the prisms adjacently disposed. Each of the microstructures has a long axis. Each of the prisms has a ridgeline extending along a first path. At least one of the microstructure groups has a long axis extending along a second path, which is different from the first path.

23 Claims, 29 Drawing Sheets

(56) References Cited

U.S. PATENT DOCUMENTS

| | | |
|---|---|---|
| 2002/0054488 A1 | 5/2002 | Ohkawa |
| 2012/0147472 A1 | 6/2012 | Kajiya et al. |
| 2015/0131317 A1 | 5/2015 | Yuki et al. |

FOREIGN PATENT DOCUMENTS

| | | |
|---|---|---|
| TW | 200705044 A | 2/2007 |
| TW | I307791 B | 3/2009 |
| TW | I312729 B | 8/2009 |
| TW | 201035608 A1 | 10/2010 |
| TW | I522663 B | 2/2016 |
| TW | I528087 B | 4/2016 |

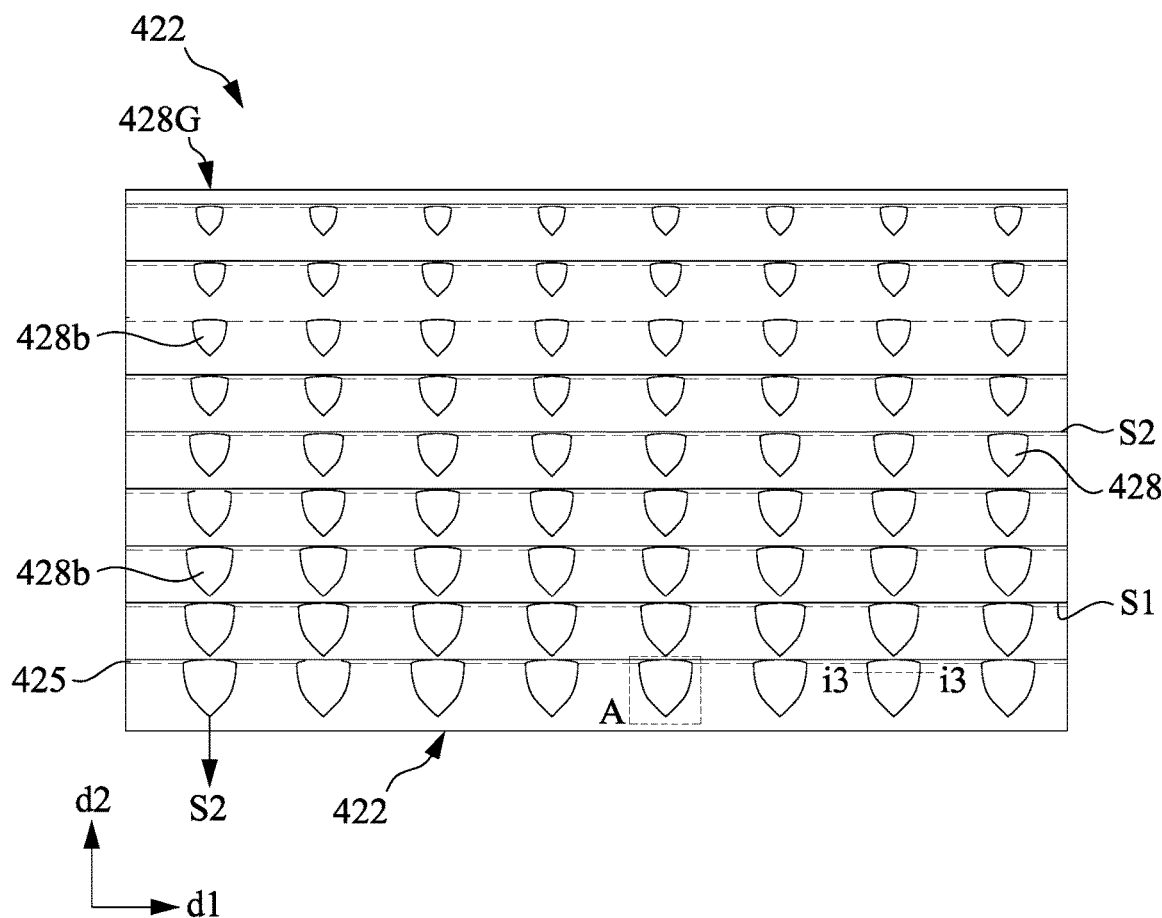
Fig. 4A
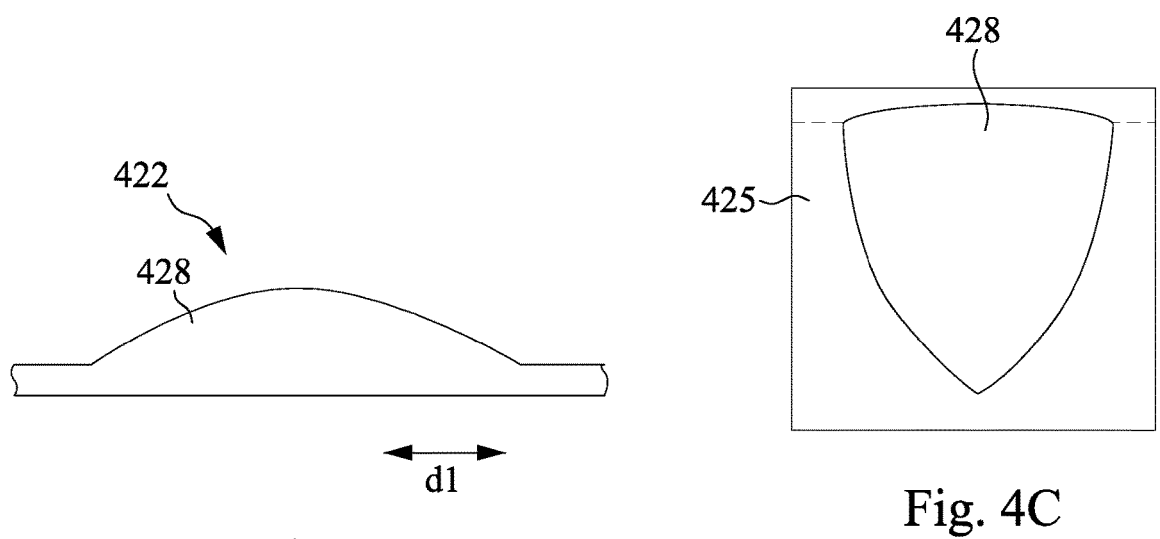
Fig. 4B
Fig. 4C

520C1

520C2

520C3

520C4

520C5

720

728G  721  722  728 725

720

728G  721  722  728 725

BACKLIGHT MODULE WITH LIGHT GUIDE HAVING GROUPS AND MICROSTRUCTURES CONNECTING ADJACENT PRISMS

CROSS-REFERENCE TO RELATED APPLICATION

This application is a Continuation-in-part of U.S. application Ser. No. 16/737,102, filed on Jan. 8, 2020, which claims priority to Taiwan Application Serial Number 108131425, filed Aug. 30, 2019, which is herein incorporated by reference in its entirety.

BACKGROUND

Field of Disclosure

The present disclosure is related to an optical module.

Description of Related Art

As technology continues to develop, the application of display devices, such as liquid crystal displays, has been widely applied in human life. However, due to the fact that a liquid crystal display needs a backlight to provide a light source, how to manufacture a backlight device with a more proper surface light source is one of the problems that need to be solved for person having ordinary skill in the art.

The existing device such as edge-lit type backlight uses a light guide plate to transmit light, and some backlights can even make use of structures at bottom surface of light guide plate to enhance the directivity of surface light source provided by the backlights. However, the disposition of these structures such as a V-cut structure may produce extra patterns, and over-sized structures may even cause pictures provided by display device to emerge corresponding patterns, and this has thus become another problem that needs to be solved for the person having ordinary skills in the art.

SUMMARY

The present disclosure relates in general to a backlight module.

According to an embodiment of the present disclosure, a backlight module has light-emitting devices and light guide plate. The light guide plate has a light-emitting surface, a bottom surface, and a first light-receiving side. The bottom surface is disposed opposite to the light-emitting surface, and the first light-receiving side connects the light-emitting surface and the bottom surface, and the light-emitting devices are disposed on the first light-receiving side along a first direction. The light guide plate further includes a plurality of prisms and a plurality of microstructure groups. The prisms are disposed on the bottom surface. The microstructure groups include microstructures, and the microstructures respectively connect two of the prisms adjacently disposed. Each of the microstructures has a long axis. Each of the prisms has a ridgeline extending along a first path. At least one of the microstructure groups has a long axis extending along a second path, which is different from the first path.

As seen from the above, light-emitting efficiency of the light guide plate of the backlight module In this embodiment of the present disclosure can be enhanced by the prisms on the bottom surface, whereas the microstructure groups on the bottom surface can avoid the surface light source provided by the light-emitting surface emerging patterns corresponded to the prisms, so as to improve directivity and uniformity of the surface light source. As the light guide plate provided by the manufacturing method of the light guide plate in this embodiment of the present disclosure applies to the backlight module, surface light source with more proper uniformity and directivity can be provided.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 4A is a schematic plain view of the light guide plate of still another embodiment of the present disclosure;

FIG. 4B is a schematic sectional view according to cutting-plane line i3 in FIG. 4A;

FIG. 4C is a schematic partial view according to area A in FIG. 4A;

DETAILED DESCRIPTION

Figure 1A:
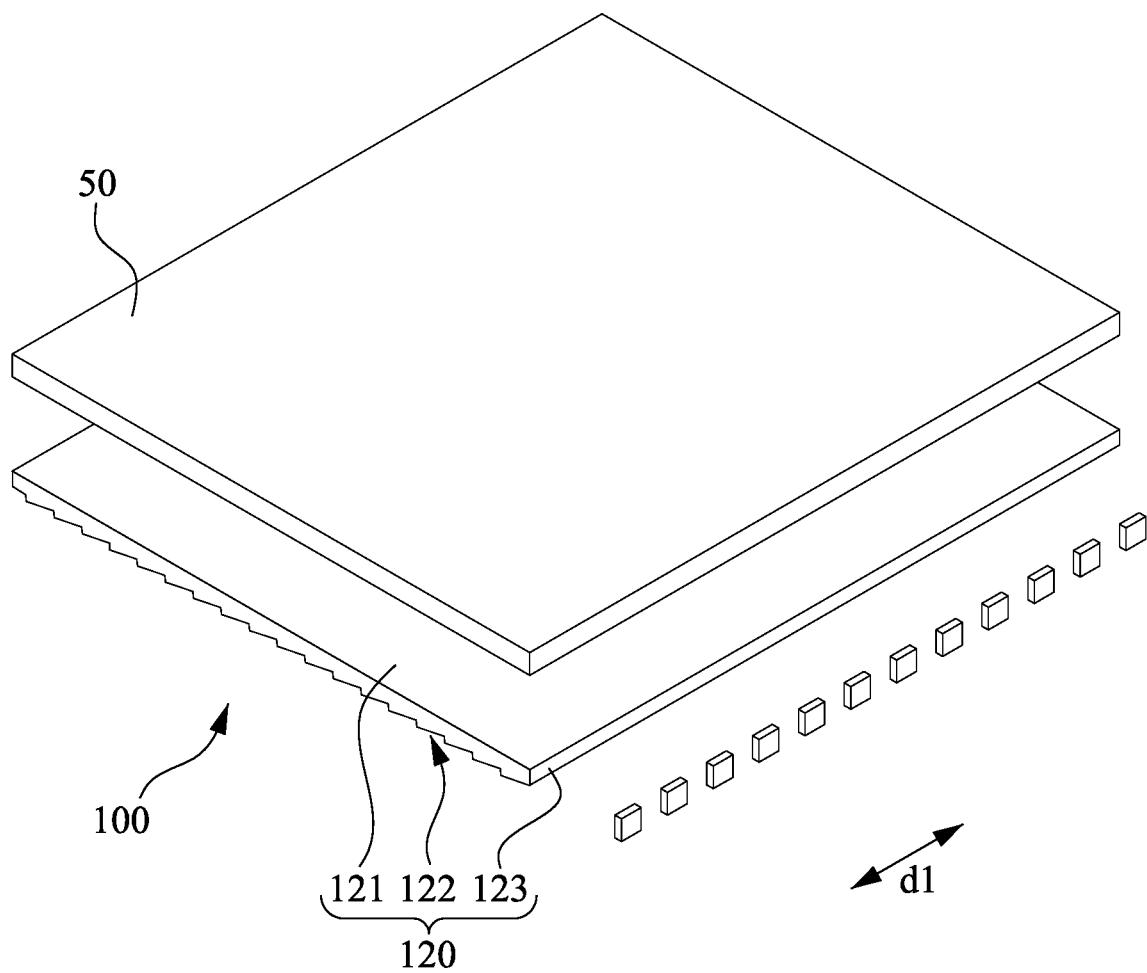
FIG. 1A is a schematic perspective exploded view of a backlight module and a display panel of an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The backlight module of an embodiment of the present disclosure including a light guide plate can be applied to a display device. For example, the backlight module of the embodiment of the disclosure can be applied to liquid crystal display (LCD) or thin film transistor LCD (TFT-LCD), but the present disclosure is not limited to the applications or techniques in the field of backlight modules.

Although the terms first, second, etc. may be used herein to describe various elements, components, or parts, these elements, components, or parts should not be limited by these terms. These terms are only used to distinguish one element, component, or part from another. For example, a first element, a first component, or a first part could be termed a second element, a second component, or a second part, without departing from the scope of example embodiments.

In the figures, the thickness of layers, films, panels, regions, etc., are exaggerated for clarity. Throughout the specification, the same reference numerals denote the same component. It will be understood that when a component such as a layer, a film, a region or a substrate is referred to as "on" or "connected to" another component, intermediate components can also be present. In contrast, when a component is referred to as "directly on" or "directly connected to" another component, no intermediate component can be present. As used herein, "connected" may refer to both physical and/or electrical connections. Furthermore, "electrical connection" or "coupled" may be the presence of other components between two elements.

FIG. 1A is a schematic view of a backlight module and a display panel of an embodiment of the present disclosure. Please referring to FIG. 1A, in this embodiment, the backlight module 100 includes a plurality of first light-emitting devices 110 and light guide plate 120.

For example, the first light-emitting devices 110 can include such as light-emitting diodes (LED) or laser diodes (LD), but the present disclosure is not limited thereto.

In this embodiment, the light guide plate 120 has a light-emitting surface 121, a bottom surface 122, and a first light-receiving side 123. The bottom surface 122 is disposed opposite to the light-emitting surface 121, the bottom surface 122 and the light-emitting surface 121 are disposed back to back, and the first light-receiving side 123 connects the light-emitting surface 121 and the bottom surface 122. The first light-emitting devices 110 are located at the first light-receiving side 123, and the first light-emitting devices 110 are arranged along a first direction d1.

For example, the light guide plate 120 of the embodiment can be placed under a display panel 50, and the light-emitting surface 121 of the light guide plate 120 faces the display panel 50. The light provided by the first light-emitting devices 110 can enter the light guide plate 120 from the first light-receiving side 123, allowing the light guide plate 120 to provide a surface light source at the light-emitting surface 121 to the display panel 50.

Figure 1B:
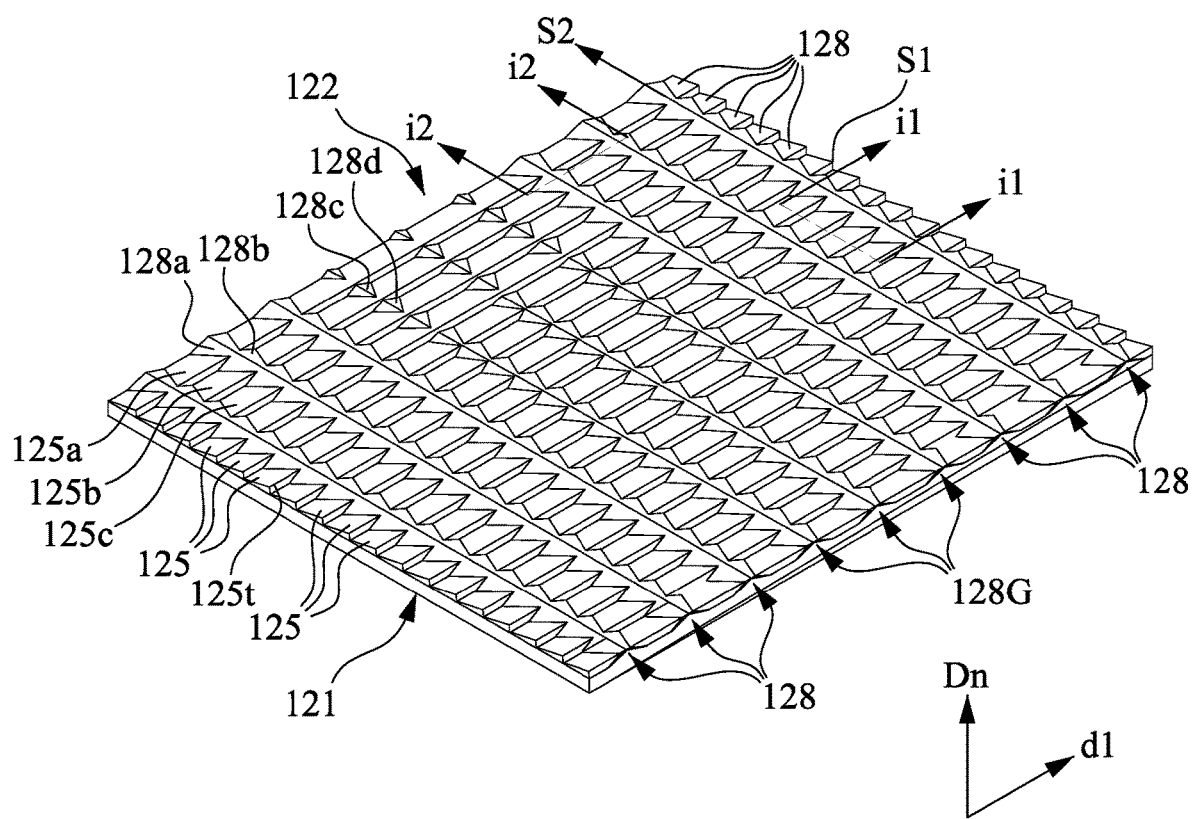
FIG. 1B is a schematic perspective view of light guide plate of an embodiment of the present disclosure.

Please refer to FIG. 1B, which is a schematic perspective view of the light guide plate 120 of the embodiment of the disclosure from another perspective, and FIG. 1B is showing the schematic perspective view while the bottom surface 122 of the light guide plate 120 facing up. In this embodiment, the light guide plate 120 further includes a plurality of prisms 125 and a plurality of microstructure groups 128G. The prisms 125 and the microstructure groups 128G are disposed on the bottom surface 122, and the prisms 125 and the microstructure groups 128G are integrately formed on the light guide plate 120.

Each of the microstructure groups 128G of the embodiment includes a plurality of microstructures 128. Each of the microstructures 128 connects the two adjacently disposed prisms 125, respectively. For example, the microstructure 128a connects to the prism 125a and the prism 125b, whereas the microstructure 128b connects to the prism 125b and the prism 125c.

Each of the prisms 125 of the embodiment has a ridgeline 125t, and the ridgeline 125t of the prisms 125 extend along a first path S1. Each of the microstructures 128 of the embodiment has a long axis 128t, and the long axis 128t of the microstructures 128 extends along a second path S2, and the second path S2 is different from the first path S1.

In this embodiment, the ridgeline 125t of the prisms 125 are extended along the first path S1, in which the first path S1 is linear and is substantially parallel to the first direction d1; the long axis 128t of the microstructures 128 are extended along the second path S2, in which the second path S2 is linear and is substantially perpendicular to the first direction d1. That is, in this embodiment, the first path S1 and the second path S2 are both linear and are perpendicular to each other, but the present disclosure is not limited thereto. In other embodiment of the present disclosure, the angle between the first path S1 and the second path S2 can be in other degrees.

To specified, in FIG. 1B and the figures referred by the following content, the prisms 125 on the bottom surface 122 and the microstructures 128 of the microstructure groups 128G are drawn in magnification to illustrate relative positions of the components, and it is not used to limit the actual sizes and positions of the components In this embodiment of the present disclosure.

Please refer to both FIG. 1A and FIG. 1B, in the backlight module 100 of the embodiment, as the first light-emitting device 110 provides light to the light guide plate 120, the prisms 125 on the bottom surface 122 can control light-emitting angle of the light emitted from the light-emitting surface 121 effectively. The microstructures 128 of the microstructure groups 128G are further distributed between the prisms 125, allowing the uniformity of the surface light source provided by the light-emitting surface 121 to be further enhanced, so as to avoid the surface light source emerging patterns corresponding to the prisms 125 in any partial area.

On the other hand, because the bottom surface 122 of the embodiment are disposed with both the prisms 125 and the microstructure groups 128G, the light provided from the light-emitting surface 121 of the backlight module 100 has high directivity. For example, as the display panel 50 forming image by the surface light source provided from the backlight module 100, because the light provided by the backlight module 100 has high directivity, the brightness and contrast of image are with higher quality, and graphic in the image can be presented clearly without emerging extra patterns, and bright or dark spots.

To be explicit, in this embodiment, the microstructures 128 of the microstructure groups 128G may be or may not be connected to each other. For example, microstructure 128a of the embodiment connects to microstructure 128b, whereas microstructure 128c is not connected to the microstructure 128d, which is adjacent to the microstructure 128c.

At the same time, on a normal direction Dn of the light-emitting surface 121, the heights of the microstructures 128a and 128b are higher than the adjacent prisms 125a-125c, whereas the heights of the microstructures 128c and 128d are not higher than the adjacent prisms 125a-125c. Thus, the microstructures 128 can be distributed on the bottom surface 122, and the heights of the microstructures 128 and the connecting conditions in between the microstructures 128 can be adjusted according to different positions, so as to further provide a more proper light adjustment effect on different positions of the light guide plate 120.

On the other hand, in this embodiment, the long axis 128t of the microstructures 128 of each of the microstructure groups 128G are arranged linear, and two of the microstructures 128 adjacently disposed may be or may not be connected to each other. Also, the sizes or the heights of the microstructures 128 and can be varied at different positions of the light guide plate 120. For example, the heights of the microstructures 128 can also be gradually increased or decreased along the second path S2, or close to or away from the light-emitting surface 121 in this embodiment. For example, in the microstructure groups 128Ga (take three for example), the heights of the microstructures 128 of each microstructure groups 128Ga on the normal direction Dn of the light-emitting surface 121 can increase or decrease along the second path S2.

In this embodiment, the prisms 125 and the microstructures 128 are protrusions protruding away from the light-emitting surface 121. That is, the prisms 125 and the microstructures 128 have positive heights measured from the bottom surface 122 of the light guide plate 120.

Figure 2A:
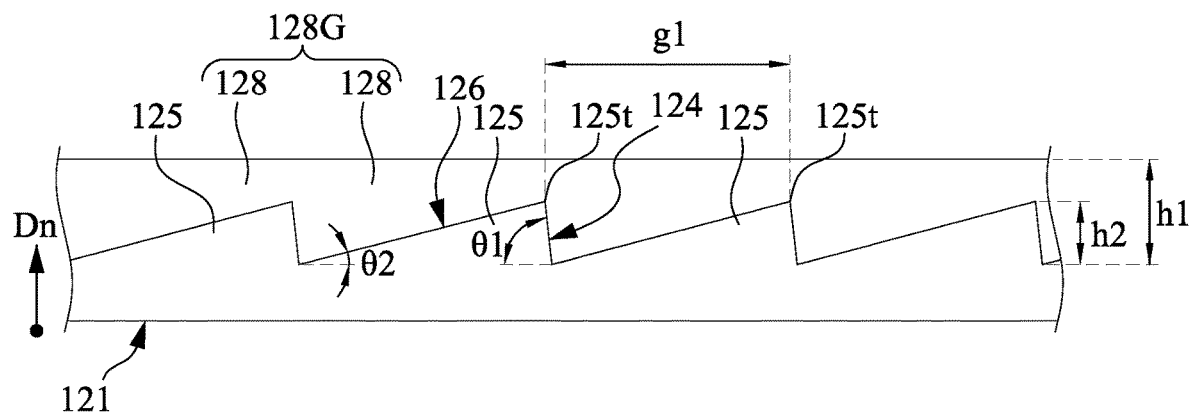
FIG. 2A is a schematic sectional view taken along cutting-plane line i1 in FIG. 1B.

Please refer to FIG. 2A, in which FIG. 2A is the schematic sectional view taken along cutting-plane line i1 in FIG. 1B. In this embodiment, each of the prisms 125 can have a plane 124 and a plane 126 connected to each other, and the prisms 125 can have a triangular section, and an included angle θ1 between the plane 124 and the light-emitting surface 121 is bigger than an included angle θ2 between the plane 126 and the light-emitting surface 121. Corresponding to the first light-receiving side 123 (see FIG. 1A) of the light guide plate 120, the plane 124 and plane 126 of every prism 125 provide proper reflection effect. For example, in this embodiment, the angle of the included angle θ1 can fall within the range between about 60 degrees to about 90 degrees, whereas the angle of the included angle θ2 can be within the range no more than about 15 degrees, but the present disclosure is not limited thereto.

On one other hand, gap g1 between every two ridgelines 125t of the prisms 125 falls within the range between about 0.01 mm and 1 mm. To be specific, the gaps g1 between the ridgeline 125t of the prisms 125 of the embodiment can change along the position, so as to adjust the distribution of the prisms 125 on the light guide plate 120.

On the other hand, the heights h1 of the prisms 125 of the embodiment of the present disclosure can be varied according to the position as well, and the prisms 125 can provide proper reflection effect corresponded to the position of the first light-receiving side 123 (see FIG. 1A). At the same time, structural height ratio of the light guide plate 120 of the embodiment in the area is bigger than one. To specified, in this embodiment and the following embodiments, the structural height ratio is the maximum value of the ratios of the height h2 of the microstructure 128 to the height h1 of the adjacent two prisms 125 in the normal direction Dn of the light-emitting surface 121. In other words, the height h2 of the microstructure 128 is higher than the height h1 of the prisms 125.

The structural height ratio of another partial area of the light guide plate 120 can be less than one, that is, the height h2 of the microstructure 128 can be less than the height h1 of the prisms 125. The structural height ratio of another partial area of the light guide plate 120 can equal to one, that is, the height h2 of the microstructures 128 can equal to the height h1 of the prisms 125. In other words, among each of the microstructure groups 128G of the embodiment of the present disclosure, the height h2 of the long axis 128t of each microstructure 128 on the normal direction Dn of the light-emitting surface 121 is higher or less than the height h1 of the two adjacent prisms 125 on the normal direction of the light-emitting surface 121.

Figure 2B:
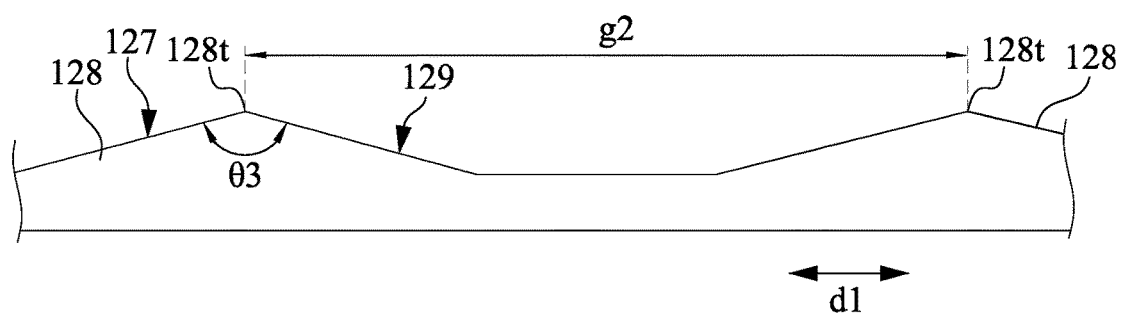
FIG. 2B is a schematic sectional view taken along cutting-plane line i2 in FIG. 1B.

Please refer to FIG. 2B, which is a schematic partial sectional view of the light guide plate 120 taken along the first direction d1 of an embodiment of the present disclosure, and the schematic sectional view is taken, for example, along the cutting-plane line i2 of FIG. 1B. To be explicit, the gaps g2 of the microstructures 128 of the embodiment on the first direction d1 can change along the position, so as to adjust the distribution of the microstructures 128.

In this embodiment, a cross-section of each of the microstructures 128 taken along the first direction d1 is a triangle, in which each of the microstructures 128 includes a first plane 127 and a second plane 129, and there is an angle θ3 between the first plane 127 and the second plane 129, but the present disclosure is not limited thereto. In this embodiment, the angle θ3 is a sharp angle and has a vertex defined by the first plane 127 and the second plane 129.

Figure 2C:
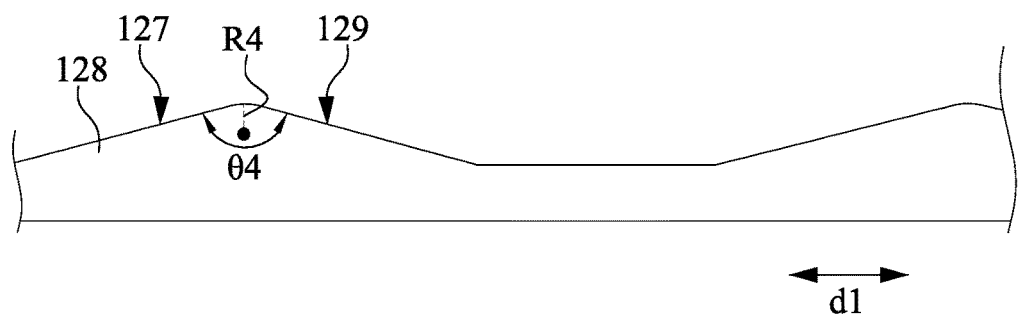
FIG. 2C is a schematic partial sectional view of a light guide plate taken along first direction in another embodiment of the present disclosure.

Please refer to FIG. 2C, which is the schematic partial sectional view of the light guide plate taken along the first direction d1 in another embodiment of the present disclosure. In this embodiment, a cross-section of each of the microstructures 128 taken along the first direction d1 is a mountain shape, in which each of the microstructures 128 includes the first plane 127 and the second plane 129, and there is an angle θ4 between the first plane 127 and the second plane 129 of the microstructure 128. In this embodiment, the angle θ4 is a round angle defined by the first plane 127 and the second plane 129 and has an angle of chamfer with a radius R4 between the first plane 127 and the second plane 129.

Figure 3A:
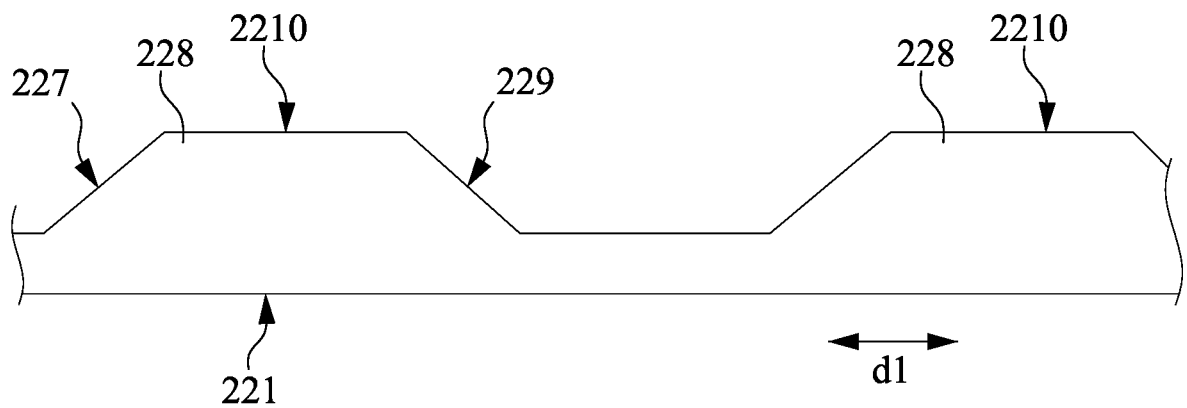
FIG. 3A is a schematic partial sectional view of a light guide plate taken along the first direction of still another embodiment of the present disclosure.

Please refer to FIG. 3A, which is the schematic partial sectional view of light guide plate 220 taken along the first direction d1 in still another embodiment of the present disclosure. The light guide plate 220 of the embodiment is similar to the light guide plate 120 of the aforementioned embodiment, and description about the identical components will not be elaborated here. The difference is that microstructure 228 of the embodiment of the present disclosure includes that, in this embodiment, a cross-section of each of the microstructures 228 taken along the first direction d1 is a trapezoid, in which each of the microstructures 228 includes a first plane 227, a second plane 229, and a third plane 2210 connecting the first plane 227 and the second plane 229. In this embodiment, the third plane 2210 of the microstructure 228 can be parallel to the light-emitting surface 221, and the first plane 227 and the second plane 229 can be inclined planes corresponding to the light-emitting surface 221, but the present disclosure is not limited thereto.

Figure 3B:
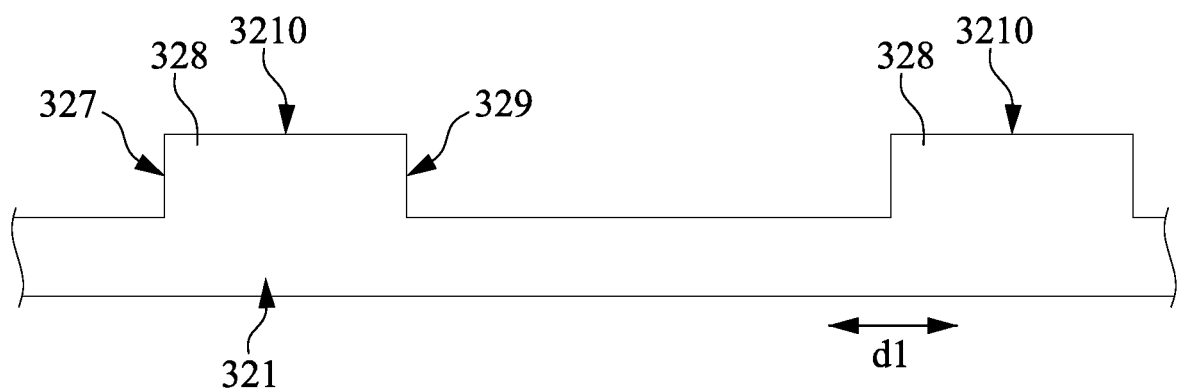
FIG. 3B is a schematic partial sectional view of a light guide plate taken along the first direction of yet another embodiment of the present disclosure.

Please refer to FIG. 3B, which is the schematic partial sectional view of light guide plate 320 taken along the first direction d1 of yet another embodiment of the present disclosure. In this embodiment, a cross-section of each of the microstructures 328 taken along the first direction d1 is a rectangle, in which the first plane 327 and second plane 329 of the microstructure 328 of the light guide plate 320 are perpendicular to light-emitting surface 321. In other words, in this embodiment, the microstructure 328 includes the first plane 327, the second plane 329, and third plane 3210 connecting to the first plane 327 and the second plane 329, the third plane 3210 is parallel to the light-emitting surface 321, and the first plane 327 and the second plane 329 are vertical planes corresponding to the light-emitting surface 321.

Please refer to FIG. 4A and FIG. 4B. FIG. 4A is a schematic plain view of light guide plate of still another embodiment of the present disclosure, and the perspective of FIG. 4A is facing the bottom surface 422 of the light guide plate 420. FIG. 4B is a schematic sectional view taken along cutting-plane line i3 in FIG. 4A. On the bottom surface 422, ridgelines of the prisms 425 are indicated by solid lines and valley lines of the prisms 425 are indicated by dotted lines in FIG. 4A. In this embodiment, light guide plate 420 is similar to the light guide plate 320 of the aforementioned embodiment, and description of the identical components will not be elaborated here. The difference in this embodiment is that, in this embodiment, a cross-section of each of the microstructures 428 taken along the first direction d1 has a curved portion, such as a dome, a semi-circle, a semi-ellipse, etc. In other words, in this embodiment, each of microstructures 428 of microstructure groups 428G includes a curved or rounded surface.

To be specific, the light guide plate 420 of the embodiment has first light-receiving side 423 and bottom surface 422. Prisms 425 extending along the first path S1 and microstructure groups 428G are disposed on the bottom surface 422. Among each of the microstructure groups 428G, the heights of microstructures 428 decreases along the second path S2 starting from the first light-receiving side 423.

Please refer to FIG. 4C, which is the schematic partial view drawn according to area A in FIG. 4A. In this embodiment, since the microstructure 428 has curved surface, the edge where microstructure 428 connects to prism 425 is also curved, so that the light guide plate 420 can provide surface light source with more proper directivity.

Figure 5A:
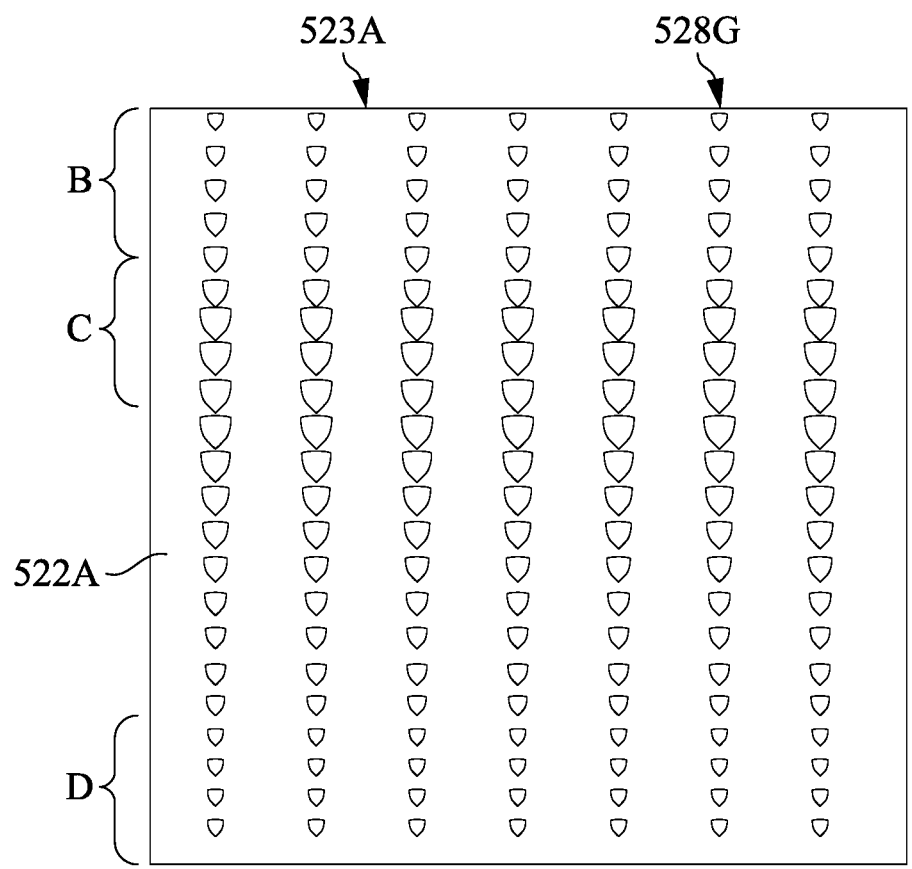
FIG. 5A is a schematic view of a light guide plate of an embodiment of the present disclosure.

Please refer to FIG. 5A, which the schematic view of light guide plate of an embodiment of the present disclosure, and to explain more clearly, prisms are omitted in FIG. 5A. In this embodiment, light guide plate 520A is similar to the light guide plate of the aforementioned embodiment, and the light guide plate 520A includes first light-receiving side 523A and bottom surface 522A, and since prism and microstructure groups of the light guide plate 520A are similar to the foresaid light guide plate 420, they will not be further described here, and only the microstructure groups 528G are shown in the drawing. The light guide plate 520A of the embodiment further includes a first area B, a second area C, and a third area D. The distance between the first area B and the first light-receiving side 523A is less than that of the third area D and the first light-receiving side 523A, and the second area C is located between the first area B and the third area D.

In this embodiment, the structural height ratio of the first area B is less than that of the second area C, and the structural height ratio of the third area D is less than that of the second area C. With the distribution as such, microstructure groups 528G of the light guide plate 520A can avoid bright spots, dark spots or other uneven patterns emerging as the light guide plate 520A is used to provide a surface light source.

Figure 5B:
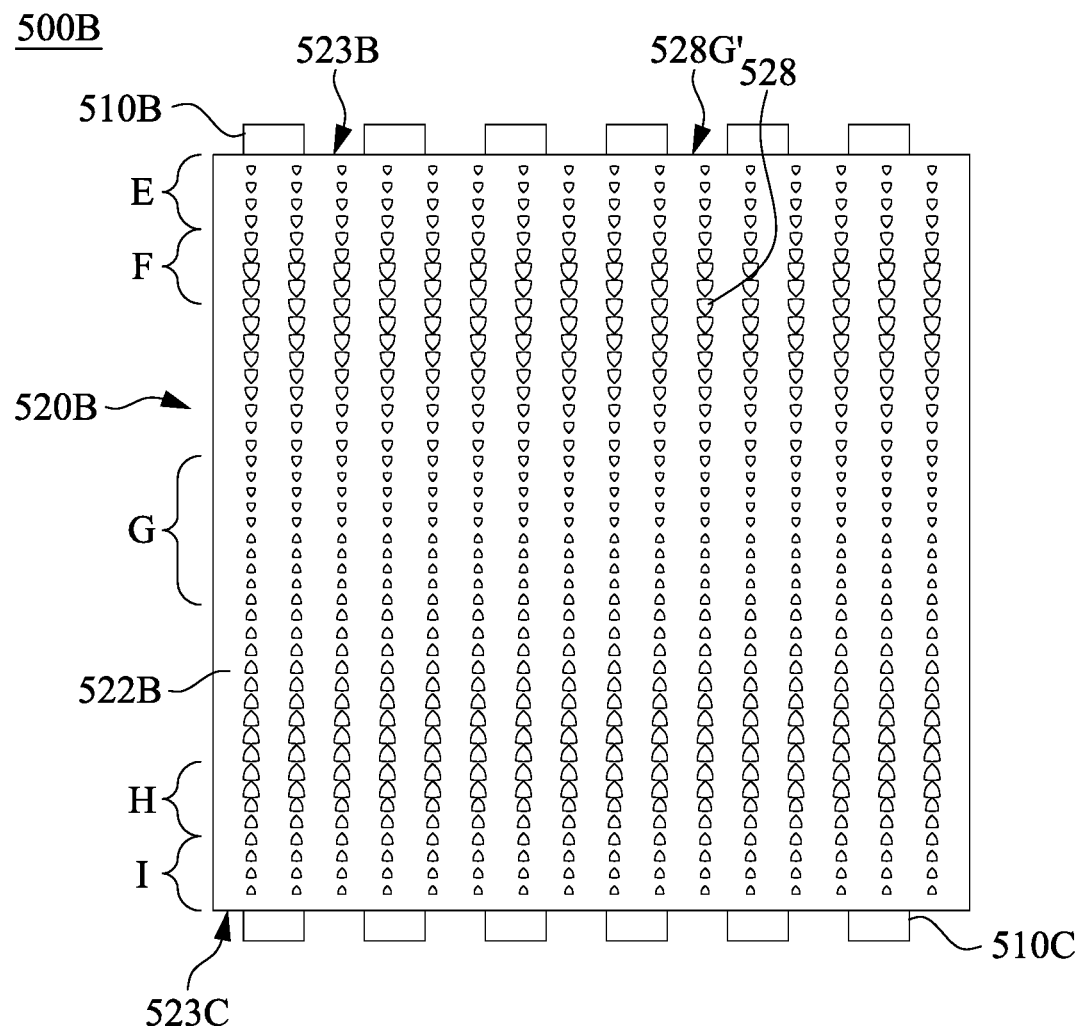
FIG. 5B is a schematic view of a backlight module of another embodiment of the present disclosure.

FIG. 5B is a schematic view of backlight module of another embodiment of the present disclosure. Please referring to FIG. 5B, backlight module 500B of the embodiment includes first light-emitting device 510B and light guide plate 520B. The light guide plate 520B is similar to the foresaid light guide plate 520A, so the description of the same component will not be further elaborated here, only the microstructure groups 528G' are shown in the drawing, and the prisms are omitted in the drawing for clarity. The backlight module 500B further includes second light-emitting devices 510C, and the light guide plate 520B further includes second light-receiving side 523C. The second light-receiving side 523C connects the bottom surface 522B and the light-emitting surface (not shown in FIG. 5B) corresponded to the bottom surface 522B, and the second light-receiving side 523C is disposed opposite to the first light-receiving side 523B. The second light-emitting devices 510C are disposed on the second light-receiving side 523C.

In this embodiment, the light guide plate 520B includes a first area E, a second area F, a third area G, a fourth area H, and a fifth area I. Distance between the first area E and the first light-receiving side 523B is less than distance between the third area G and the first light-receiving side 523B, and the second area F is located between the first area E and the third area G. On the other hand, distance between the fifth area I and the second light-receiving side 523C is less than distance between the third area G and the second light-receiving side 523C, and the fourth area H is located between the third area G and the fifth area I.

In the light guide plate 520B of the embodiment, both structural height ratio in the first area E and structural height ratio in the third area G are less than structural height ratio in the second area F, that is, the height of microstructure on the normal direction of light-emitting surface in the second area F is higher than the height of microstructure 528 of the microstructure group 528G' in the first area E as well as the height of microstructure 528 of the microstructure group 528G' in the third area G.

On the other hand, in the light guide plate 520B of the embodiment of the present disclosure, both structural height ratio in the fifth area I and the structural height ratio in the third area G are less than structural height ratio in the fourth area H, that is, the height of microstructure 528 of the microstructure group 528G' on the normal direction of light-emitting surface in the fourth area H is higher than the height of microstructure 528 of the microstructure group 528G' in the third area G as well as the height of microstructure in the fifth area I.

Figure 5C:
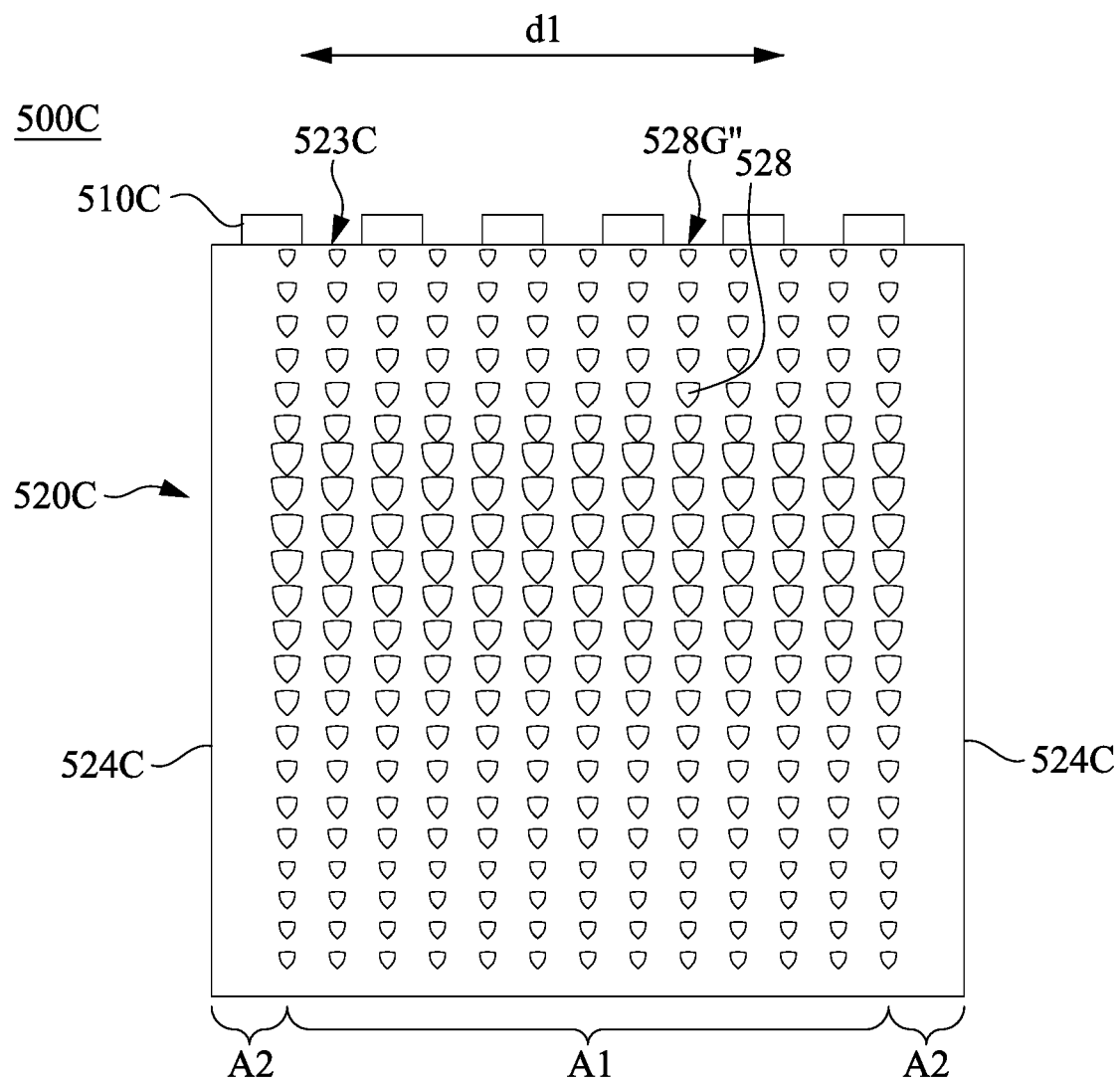
FIG. 5C is a schematic view of a backlight module of yet another embodiment of the present disclosure.

Reference is made to FIG. 5C, which is a schematic view of backlight module of yet another embodiment of the present disclosure. The backlight module 500C of the embodiment includes first light-emitting devices 510C and light guide plate 520C. The light guide plate 520C is similar to the foresaid light guide plate 520A, so the description of the same component will not be further elaborated here, only the microstructure groups 528G" are shown in the drawing, and the prisms are omitted in the drawing for clarity. The difference is that the light guide plate 520C includes a middle region A1 and two side regions A2, in which the middle region A1 is between the side regions A2. The middle region A1 and the side regions A2 are arranged along the first direction d1. For example, the light-receiving side 523C of the light guide plate 520C connects the middle region A1 and the side regions A2.

In this embodiment, the prisms (not shown) and the microstructure groups 528G are disposed only at the middle region A1, and the side regions A2 are free from disposing the prisms and the microstructure groups 528G. For example, the width W1 of the side regions A2 ranging from side surfaces 524C is greater than or equal to 0 mm and is smaller than about 10 mm.

The design of the side regions A2 being free from disposing the prisms and the microstructure groups can solve the problem of light leakage or light spout at the display side edge. The design of the side regions A2 being free from disposing the prisms and the microstructure groups can also apply in other embodiments, such as the embodiments discussed previously in FIG. 1B or discussed later in FIGS. 7A-7D, the invention is not limited to.

Figure 5D:
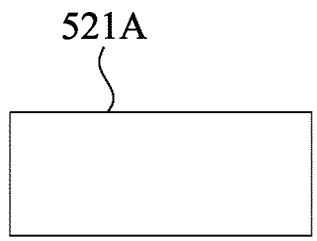
FIG. 5D to FIG. 5H are schematic sectional view of different embodiments of the side regions A2 taken along the direction d1 in FIG. 5C.
Figure 5E:
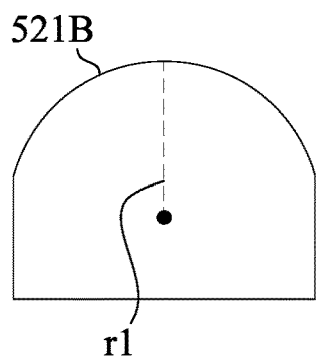
Figure 5F:
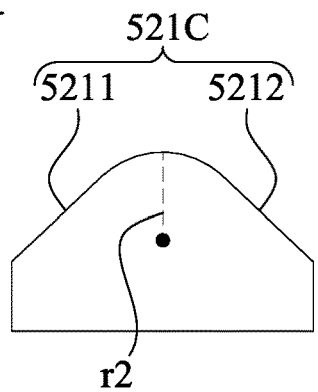
Figure 5G:
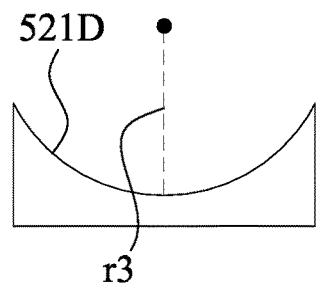
Figure 5H:
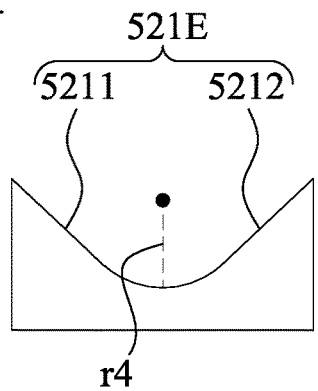

FIG. 5D to FIG. 5H are schematic sectional view of different embodiments of the side regions A2 taken along the direction d1 in FIG. 5C. As illustrated in FIG. 5D, the light emitting surface 521A of the light guide plate 520C1 is a plane surface. As illustrated in FIG. 5E, the light emitting surface 521B of the light guide place 520C2 is a convex surface with an angle of chamfer with a radius r1. As illustrated in FIG. 5F, the light emitting surface 521C of the light guide plate 520C3 is a convex surface having two side surfaces 5211, 5212 and an angle of chamfer with a radius r2 therebetween. As illustrated in FIG. 5G, the light emitting surface 521D of the light guide plate 520C4 is a concave surface with an angle of chamfer with a radius r3. As illustrated in FIG. 5H, the light emitting surface 521E of the light guide plate 520O5 is a concave surface having two side surfaces 5211, 5212 and an angle of chamfer with a radius r4 therebetween.

Figure 6:
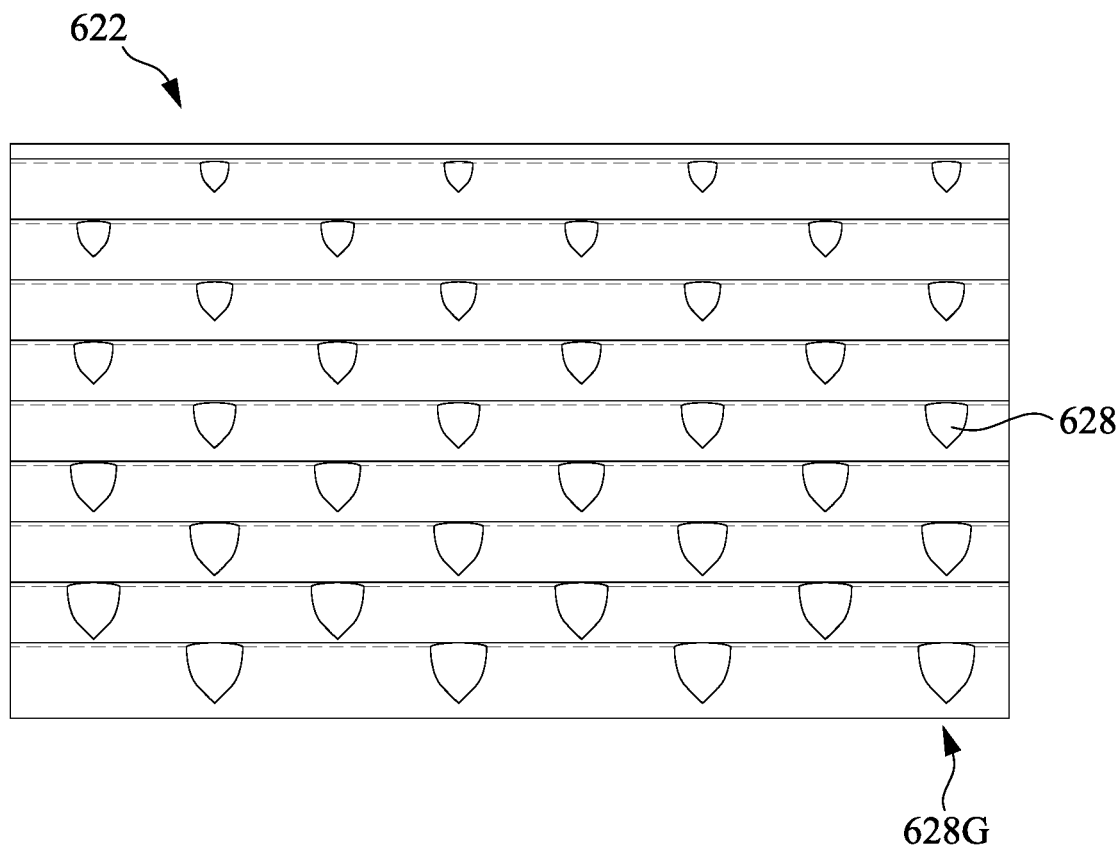
FIG. 6 is a schematic view of a light guide plate of still another embodiment of the present disclosure.

Please refer to FIG. 6, which is the schematic view of light guide plate of still another embodiment of the present disclosure. In this embodiment, the light guide plate 620 includes microstructure groups 628G disposed on bottom surface 622, and adjacent microstructures 628 of the microstructure groups 628G are arranged in alternative manner.

Figure 7A:
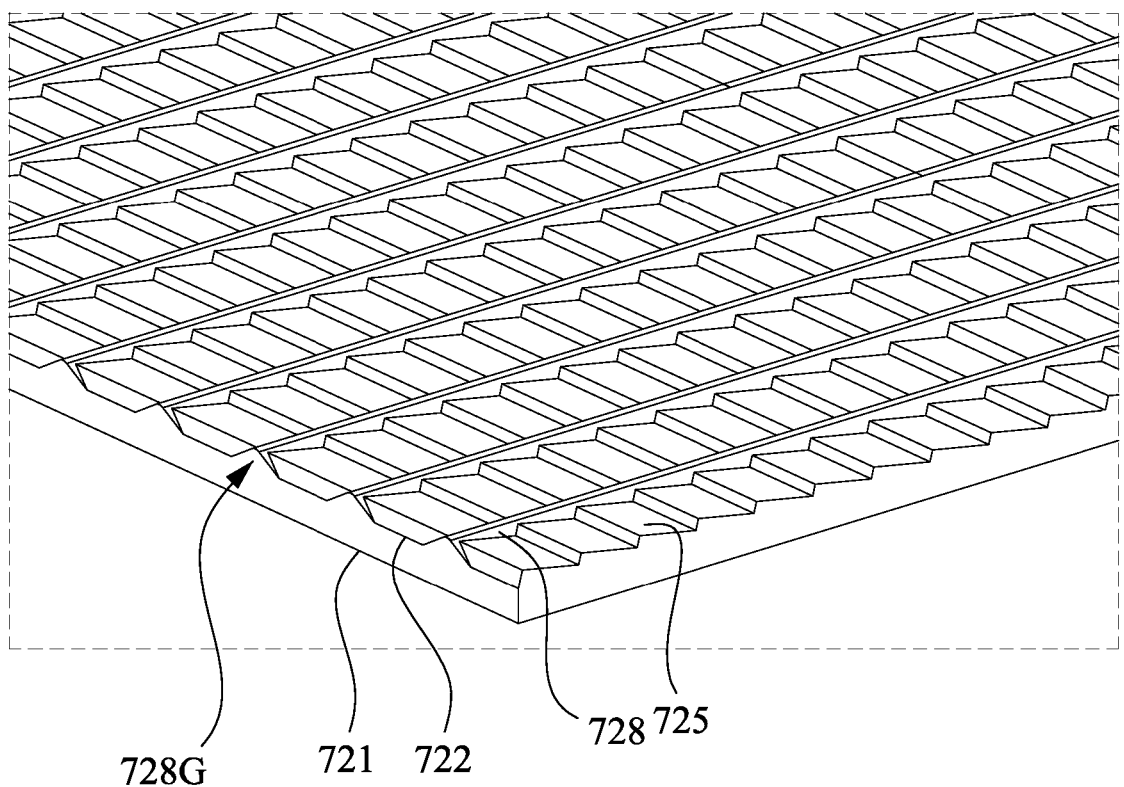
FIGS. 7A-7D are partial views of different embodiments of the invention.

Further referring to FIGS. 7A-7D, which are partial views of different embodiments of the invention, viewed while the bottom surface 722 of the light guide plate 720 facing up. As shown in FIG. 7A, the prisms 725 and the microstructures 728 of the microstructure groups 728G are protrusions protruding from the light-emitting surface 721 of the light guide plate 720.

Figure 7B:
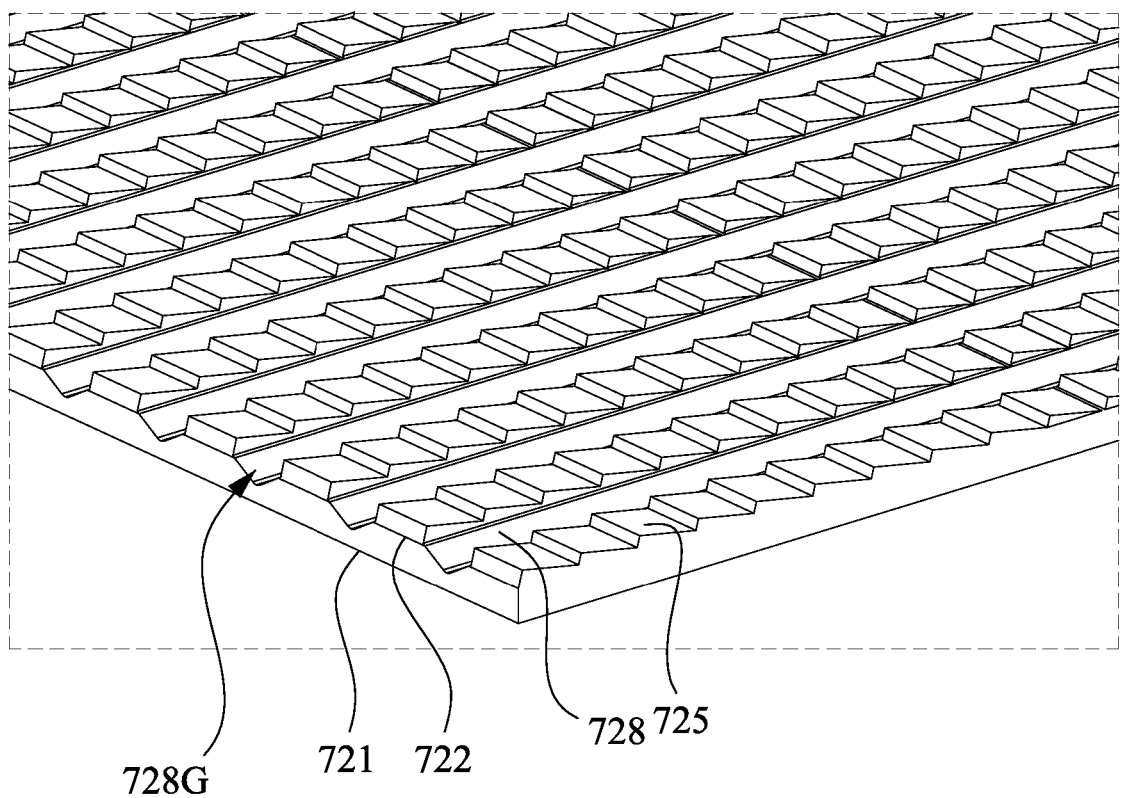

Alternatively, as shown in FIG. 7B, the prisms 725 are protrusions protruding from the light-emitting surface 721 of the light guide plate 720, and the microstructures 728 of the microstructure groups 728G are concaves recessing towards the light-emitting surface 721 of the light guide plate 720.

Figure 7C:
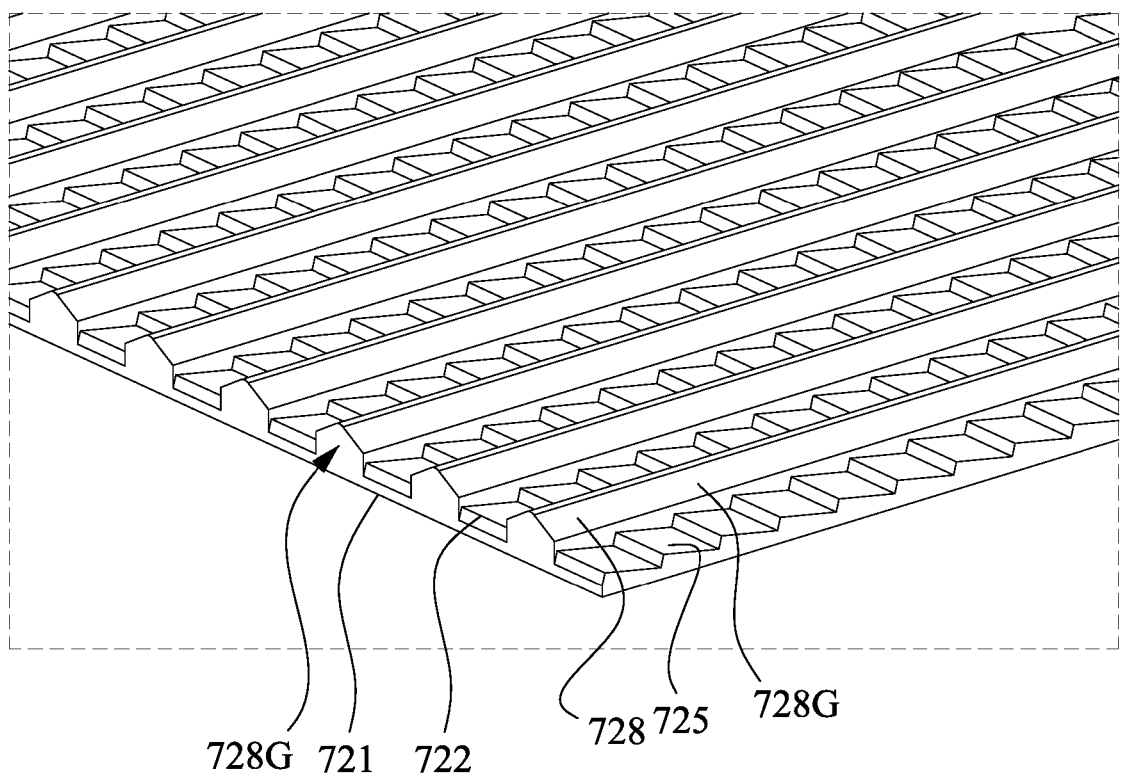

Alternatively, as shown in FIG. 7C, the prisms 725 are concaves recessing towards the light-emitting surface 721 of the light guide plate 720, and the microstructures 728 of the microstructure groups 728G are protrusions protruding from the light-emitting surface 721 of the light guide plate 720.

Figure 7D:
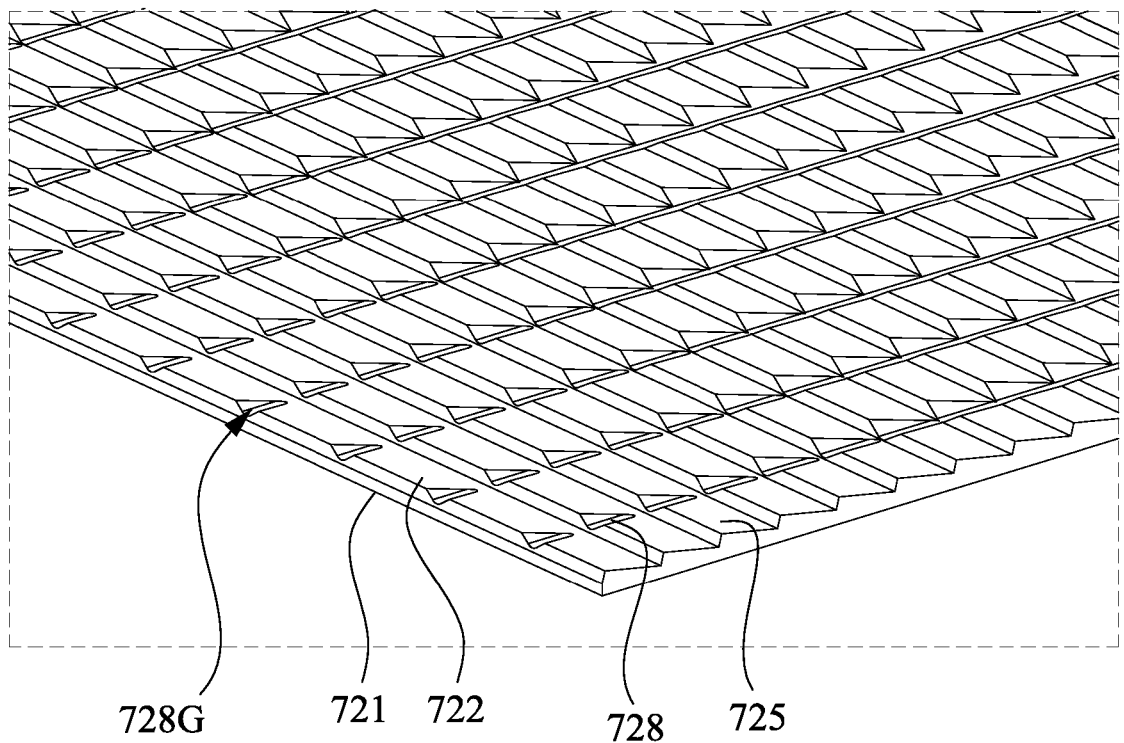

Alternatively, as shown in FIG. 7D, the prism 725 and the microstructures 728 of the microstructure groups 728G are concaves recessing towards the light-emitting surface 721 of the light guide plate 720.

The cross-section of the microstructures 728 of the microstructure groups 728G of FIGS. 7A-7D can be a triangle or other shapes discussed previously.

The light guide plates of the above embodiments can be formed, for example, by placing a substrate with a processing plane and molding trenches which corresponding to prisms and the microstructures on rollers, and cutting the processing plane of the substrate on the rollers when rolling along a thread-like path. Thereby, a mold which can form bottom surface of light guide plate can be provided and forms the bottom surface of light guide plate by molding. For example, the manufacturing method includes cutting first molding trenches on the processing plane of the substrate by a first cutting tool along the first path S1, and the contour of the first cutting tool is, for example, similar to a section of the aforementioned prisms.

Then, the manufacture method includes using a second cutting tool to cut second molding trenches on the processing plane having the first molding trenches along the second path S2, and the contour of the second cutting tool is, for example, similar to a section of the aforementioned microstructures. By the aforementioned step, the substrate can form a similarity of the microstructure groups and the prisms on the bottom surface of the light guide plate by molding.

Figure 8A:
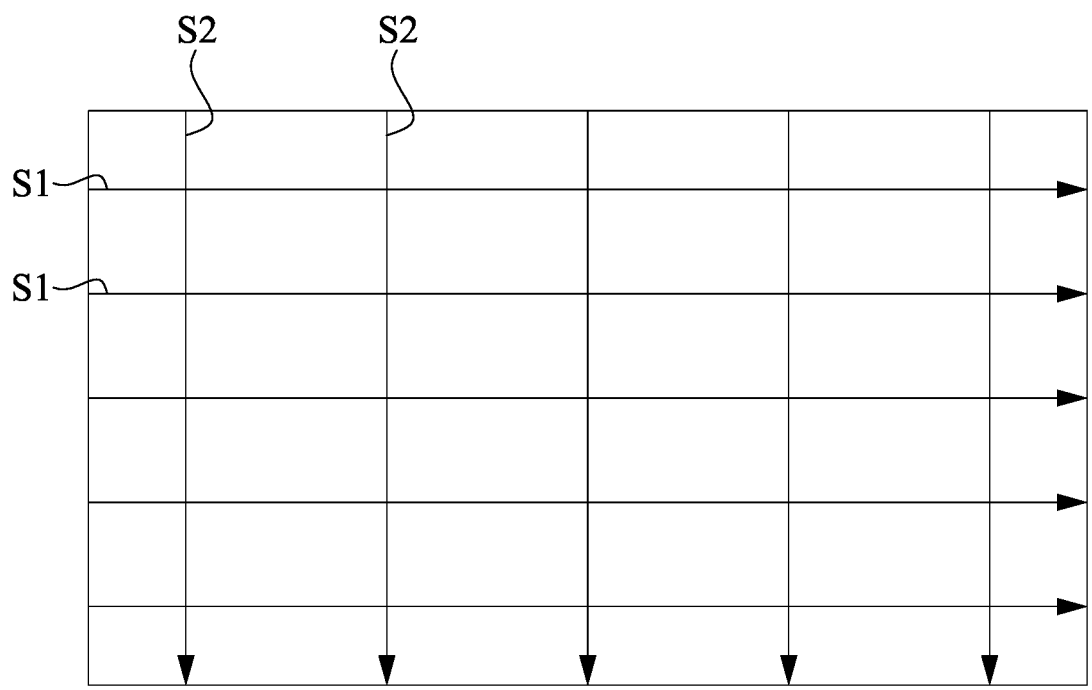
FIG. 8A to FIG. 8O are schematic views of the arrangements of the prisms and the microstructure groups on the bottom surface of the light guide plate, according to different embodiments of the invention.
Figure 8B:
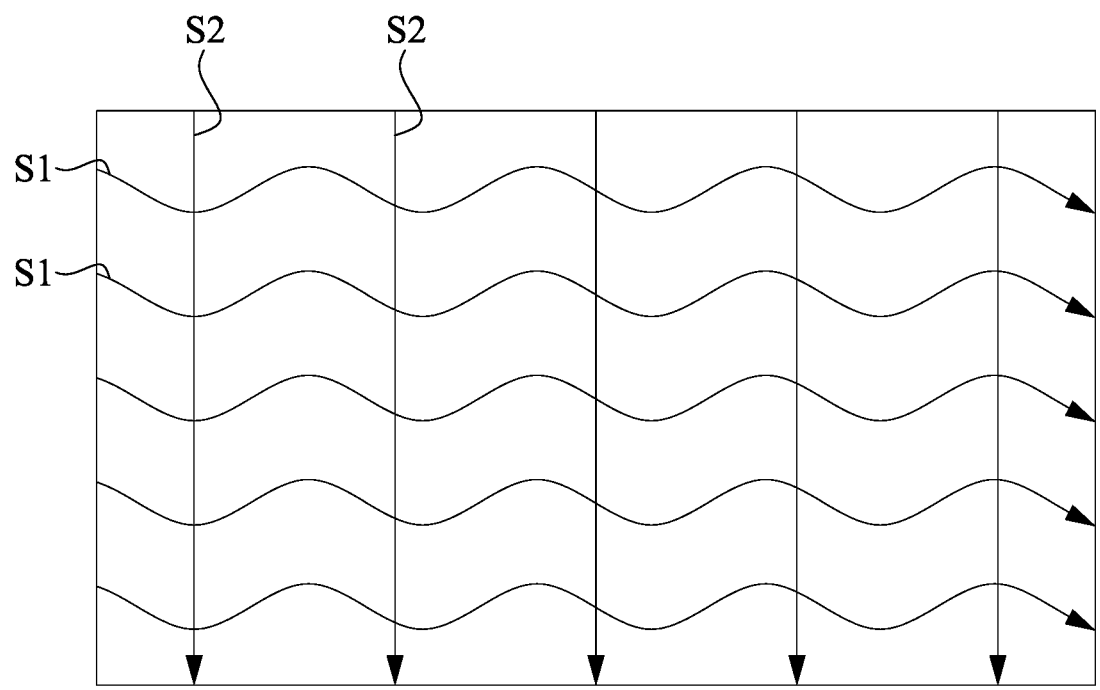
Figure 8C:
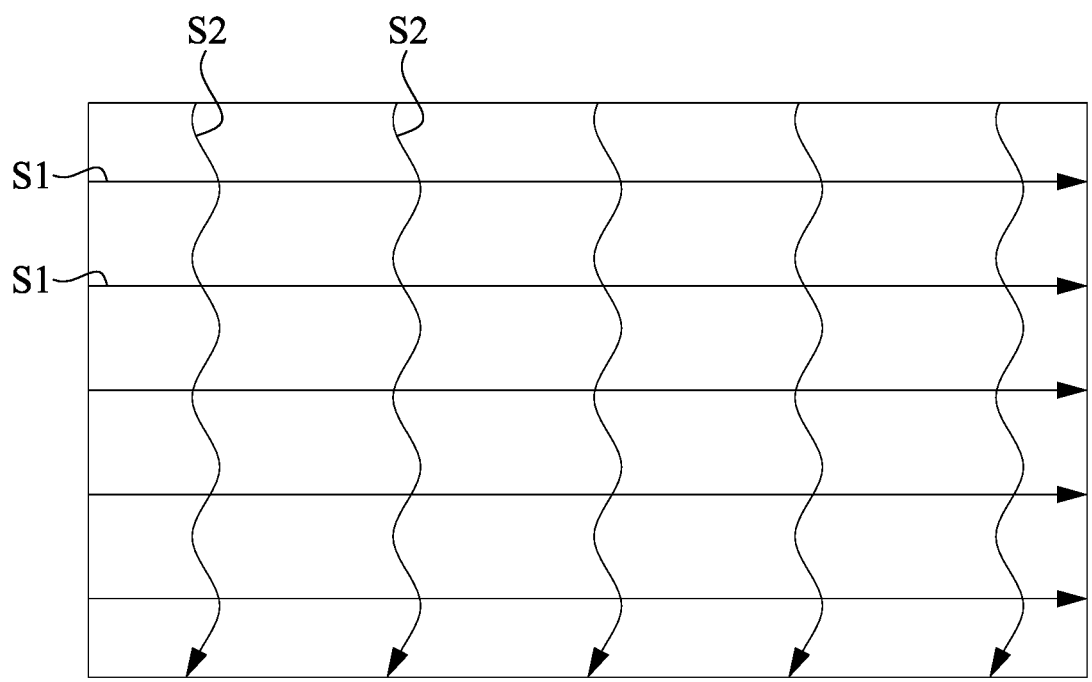
Figure 8D:
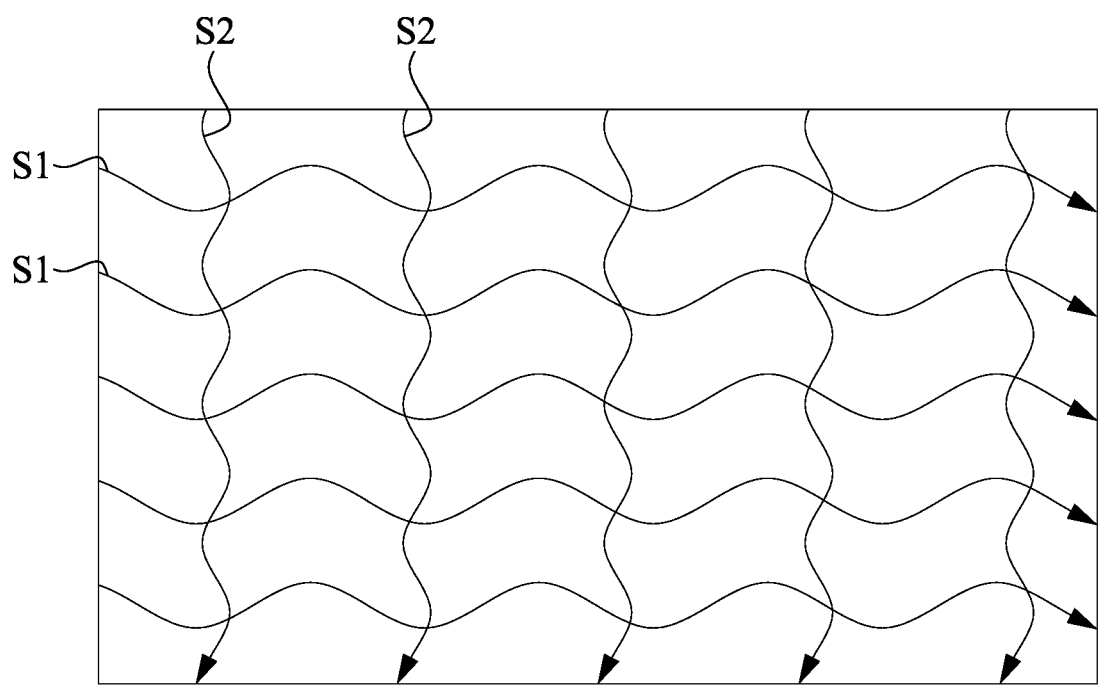
Figure 8E:
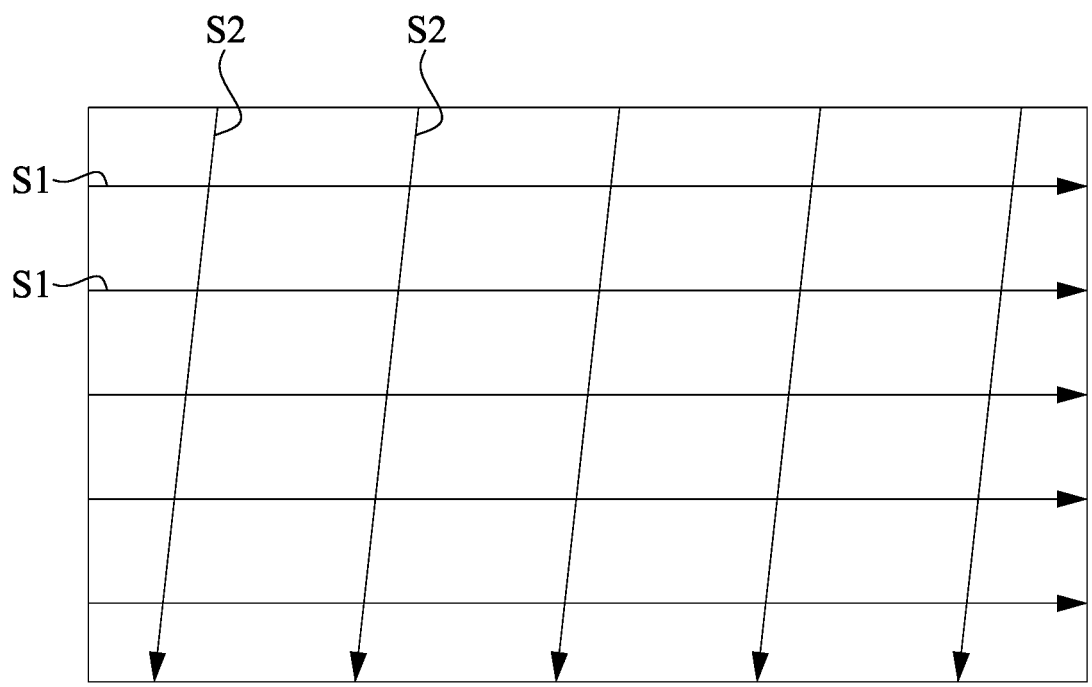
Figure 8F:
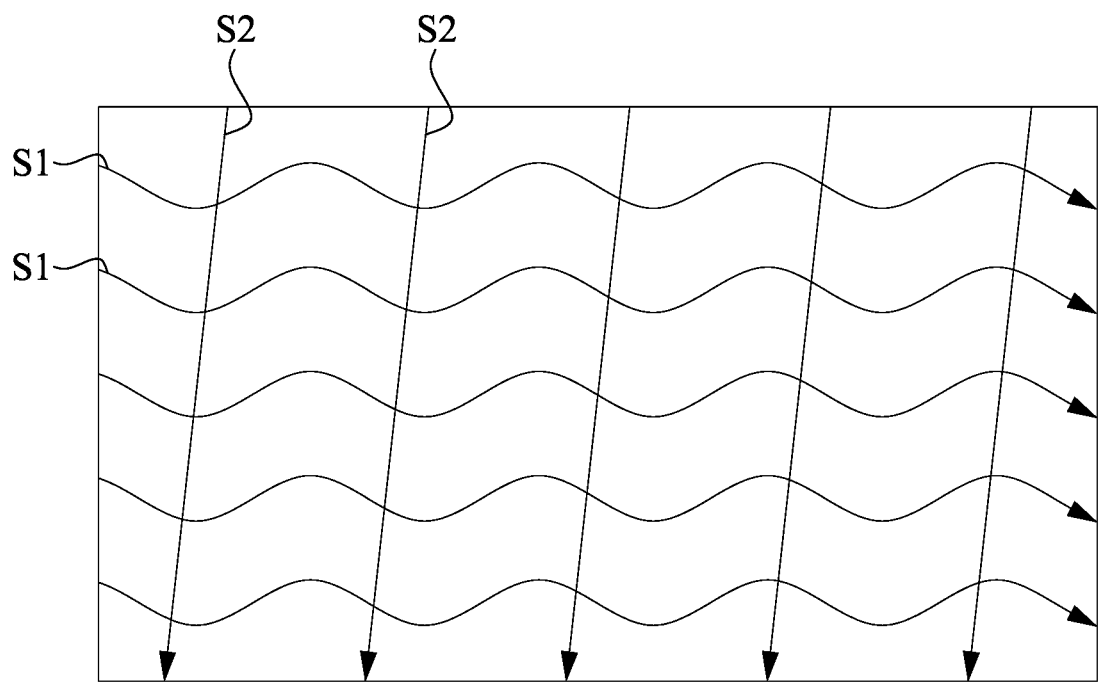
Figure 8G:
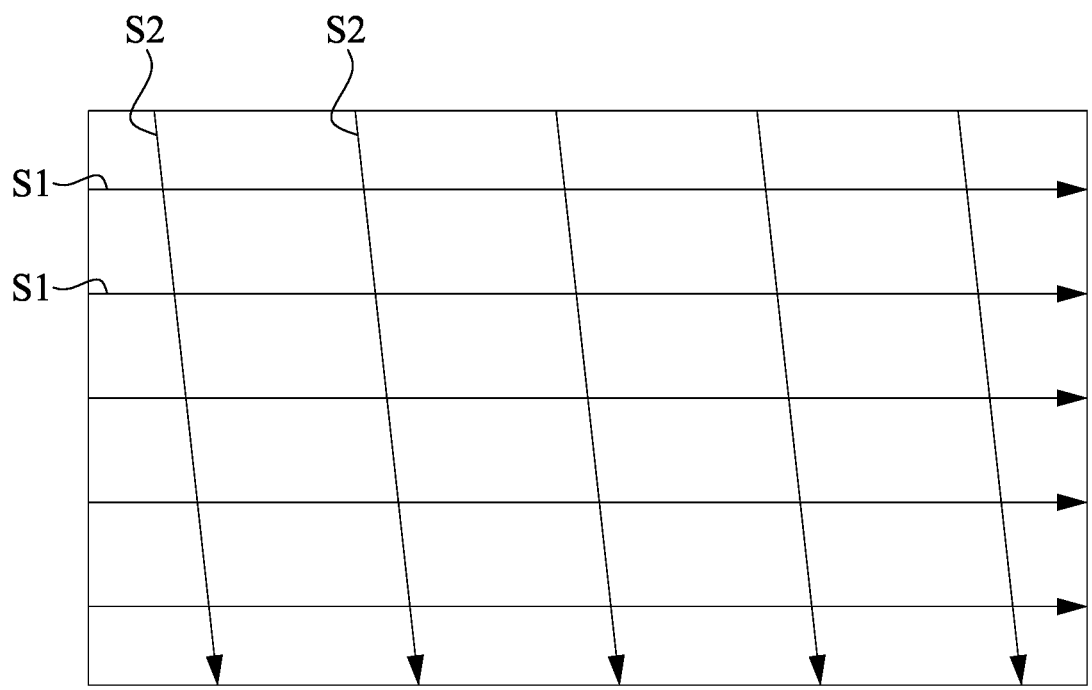
Figure 8H:
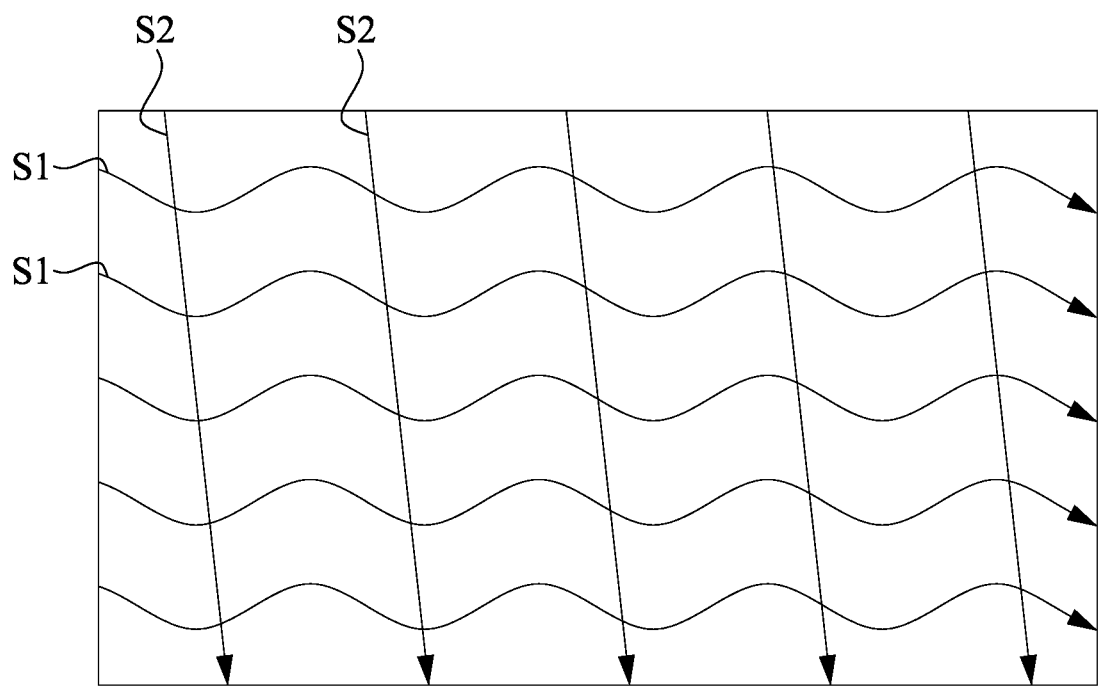
Figure 8I:
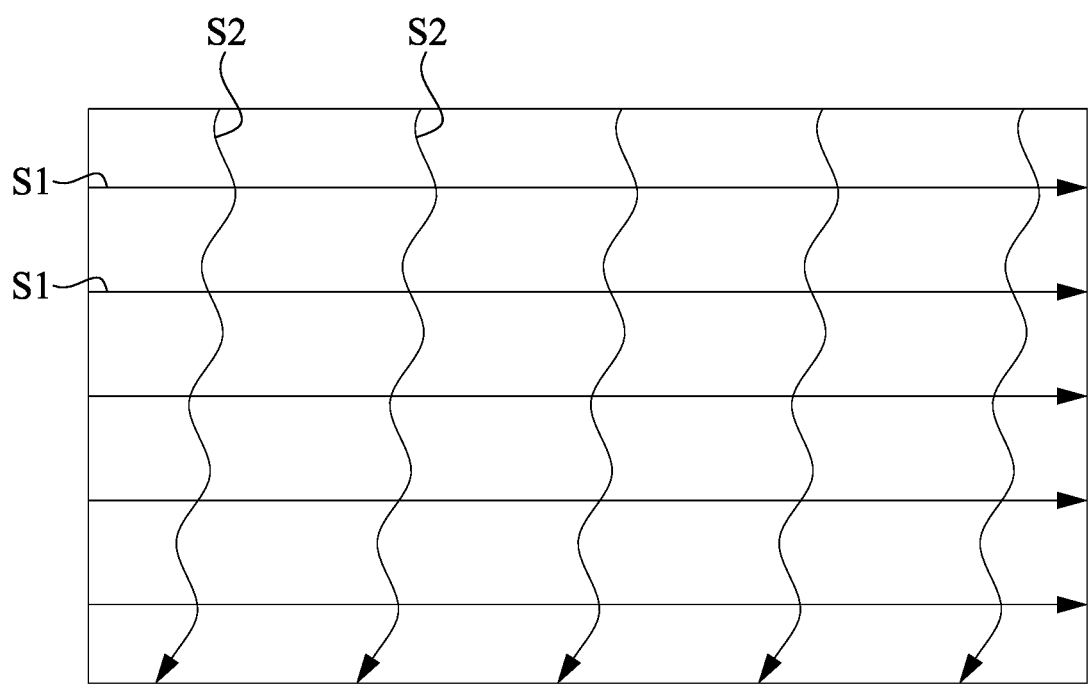
Figure 8J:
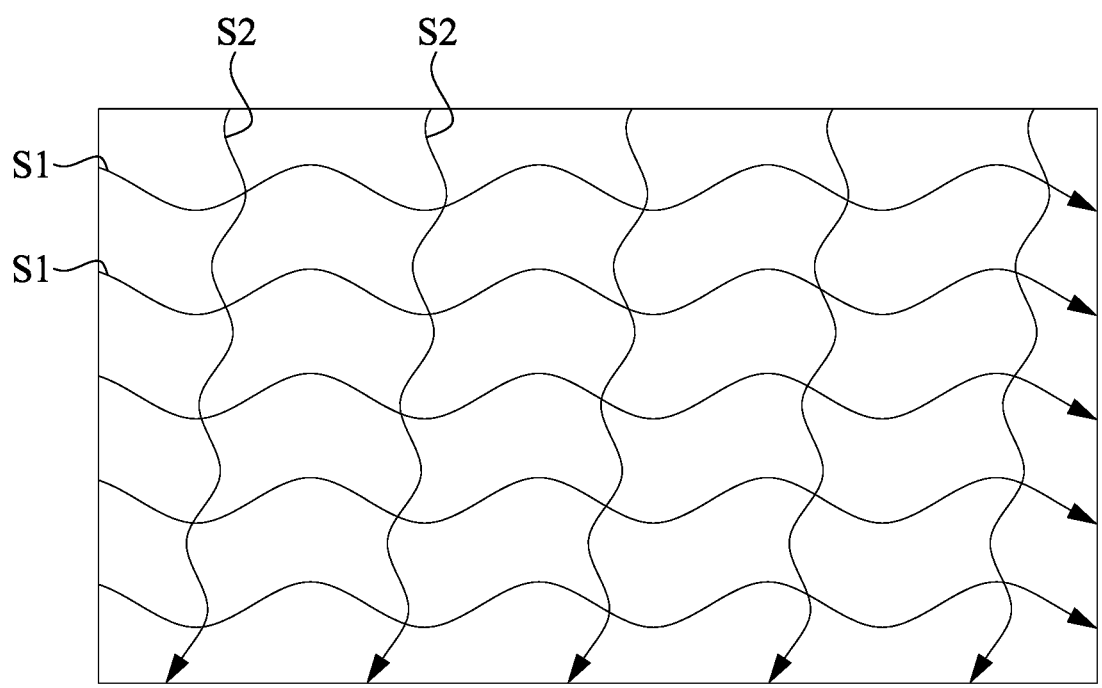
Figure 8K:
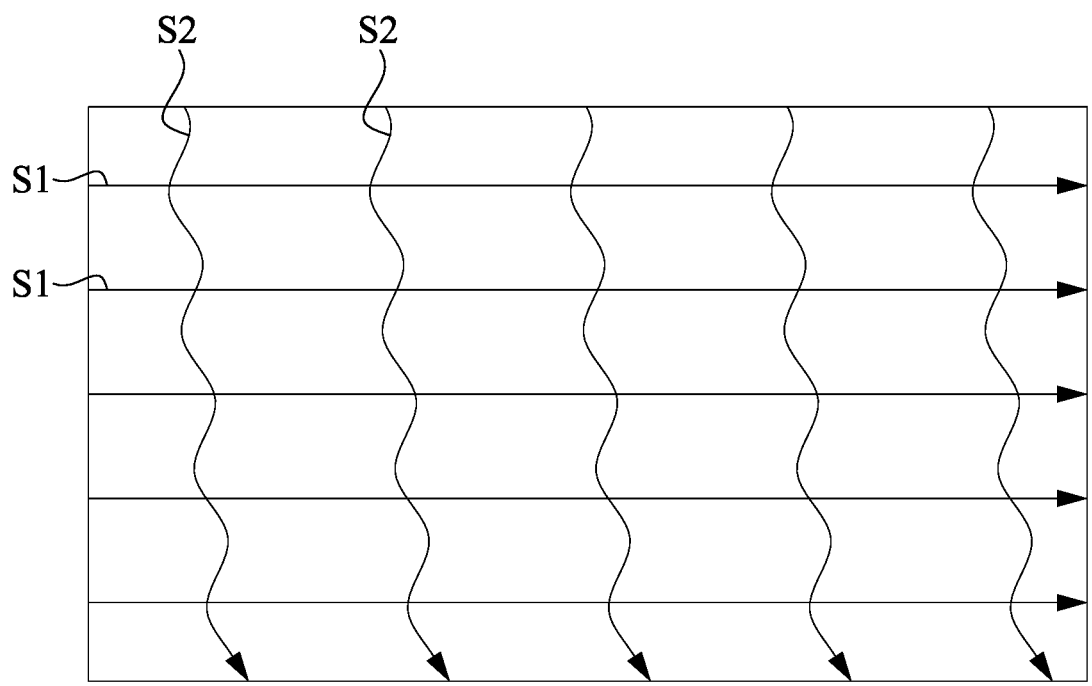
Figure 8L:
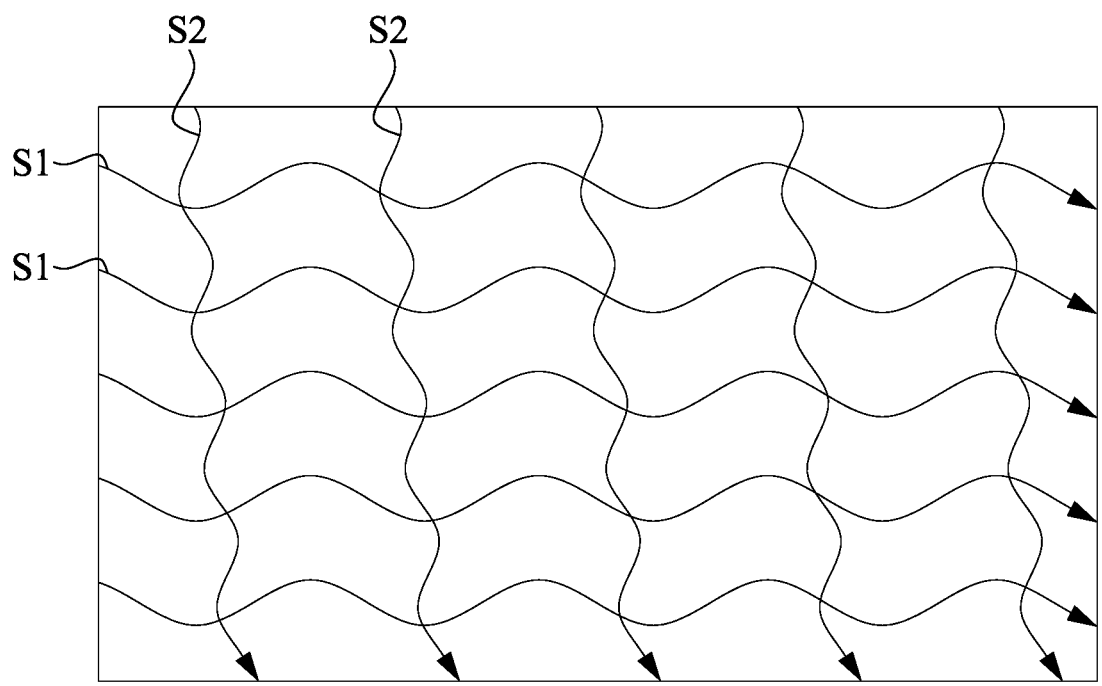
Figure 8M:
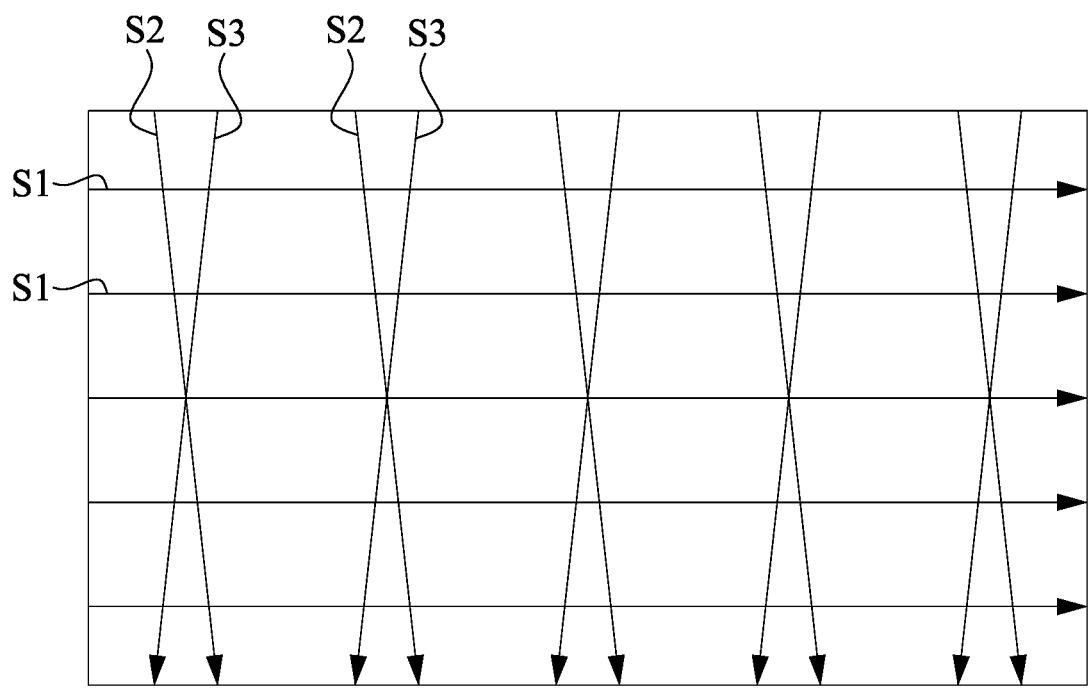
Figure 8N:
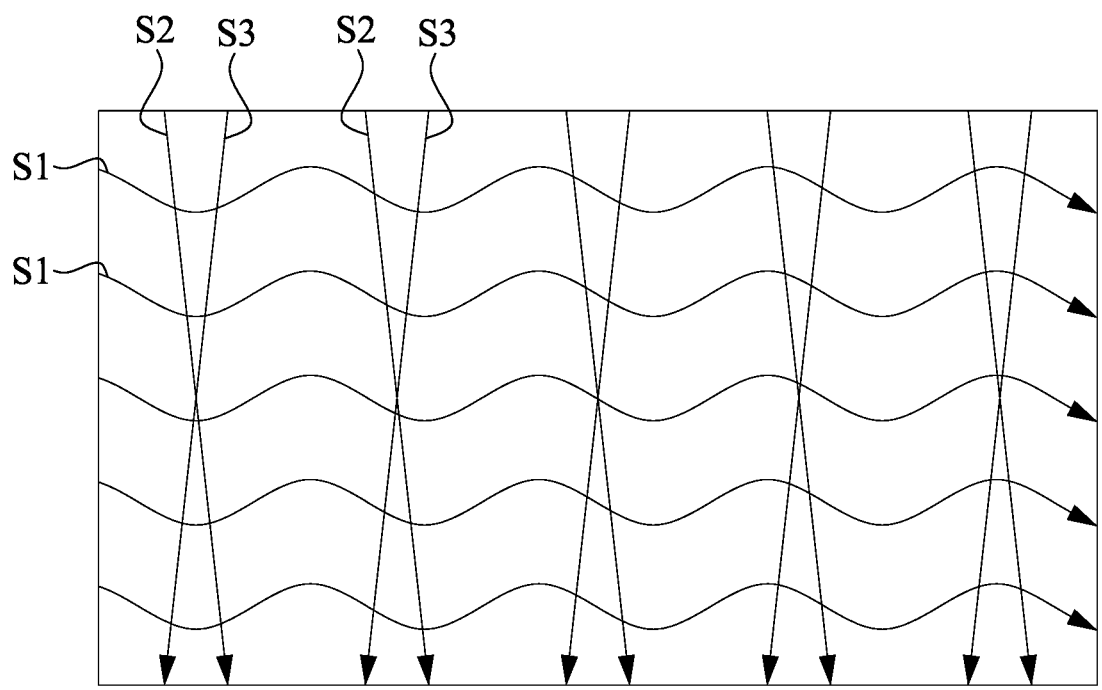
Figure 8O:
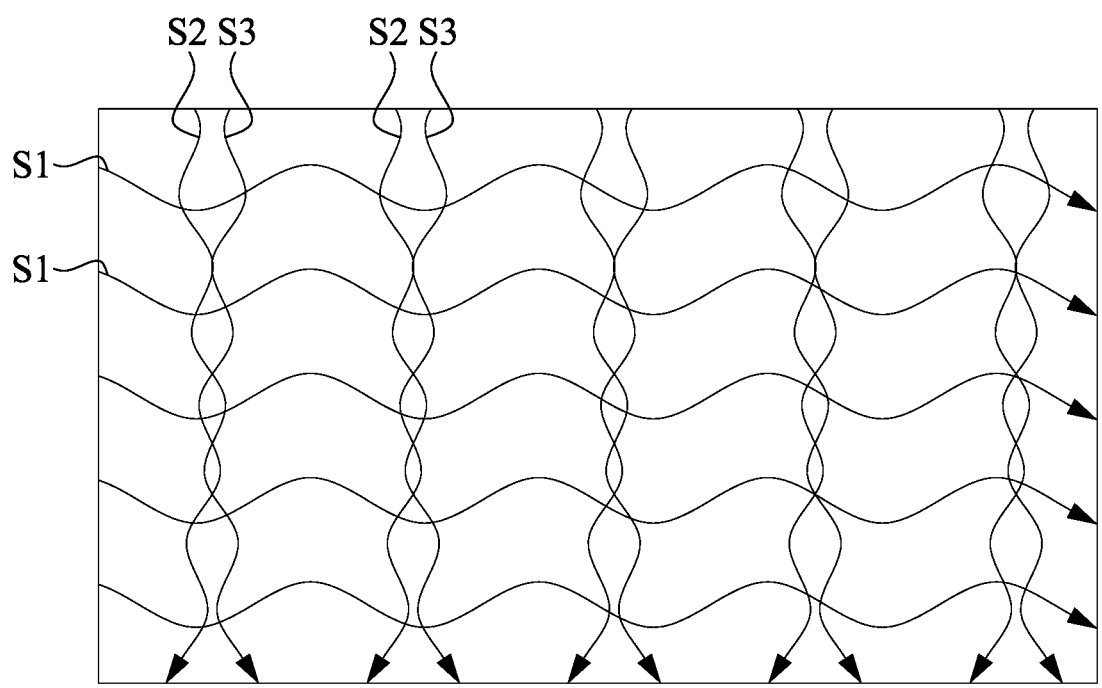

Please refer to FIG. 8A to FIG. 8O, which are schematic views of the arrangements of the prisms and the microstructure groups on the bottom surface of the light guide plate, according to different embodiments of the invention, for simplifying the drawing, the structure details of the prisms and the microstructure groups are not illustrated. As shown in FIG. 8A, the prisms extend along the first path S1, and each of the microstructure groups extends along the second path S2. In this embodiment, the first path S1 and the second path S2 are both linear. The direction of the first path S1 is substantially parallel to the light-receiving surface 823 of the light guide plate 820, and the direction of the second path S2 is substantially perpendicular to the light-receiving surface 823 of the light guide plate 820.

As shown in FIG. 8B, the prisms extend along the first path S1, and each of the microstructure groups extends along the second path S2. In this embodiment, the second path S2 is linear, and the first path S1 is non-linear. For example, the first path S1 is a wavy path. The direction of the first path S1 is substantially parallel to the light-receiving surface 823 of the light guide plate 820, and the direction of the second path S2 is substantially perpendicular to the light-receiving surface 823 of the light guide plate 820.

As shown in FIG. 8C, the prisms extend along the first path S1, and each of the microstructure groups extends along the second path S2. In this embodiment, the first path S1 is linear, and the second path S2 is non-linear. For example, the second path S2 is a wavy path. The direction of the first path S1 is substantially parallel to the light-receiving surface 823 of the light guide plate 820, and the direction of the second path S2 is substantially perpendicular to the light-receiving surface 823 of the light guide plate 820.

As shown in FIG. 8D, the prisms extend along the first path S1, and each of the microstructure groups extends along the second path S2. In this embodiment, both the first path S1 and the second path S2 are non-linear. For example, the first path S1 and the second path S2 are wavy paths. The direction of the first path S1 is substantially parallel to the light-receiving surface 823 of the light guide plate 820, and the direction of the second path S2 is substantially perpendicular to the light-receiving surface 823 of the light guide plate 820.

As shown in FIG. 8E, the prisms extend along the first path S1, and each of the microstructure groups extends along the second path S2. In this embodiment, both the first path S1 and the second path S2 are linear. The direction of the first path S1 is substantially parallel to the light-receiving surface 823 of the light guide plate 820, and the direction of the second path S2 is inclined to the right side relative to the light-receiving surface 823 of the light guide plate 820.

As shown in FIG. 8F, the prisms extend along the first path S1, and each of the microstructure groups extends along the second path S2. In this embodiment, the first path S1 is non-linear such as wavy, and the second path S2 is linear. The direction of the first path S1 is substantially parallel to the light-receiving surface 823 of the light guide plate 820, and the direction of the second path S2 is inclined to the right side relative to the light-receiving surface 823 of the light guide plate 820.

As shown in FIG. 8G, the prisms extend along the first path S1, and each of the microstructure groups extends along the second path S2. In this embodiment, both the first path S1 and the second path S2 are linear. The direction of the first path S1 is substantially parallel to the light-receiving surface 823 of the light guide plate 820, and the direction of the second path S2 is inclined to the left side relative to the light-receiving surface 823 of the light guide plate 820.

As shown in FIG. 8H, the prisms extend along the first path S1, and each of the microstructure groups extends along the second path S2. In this embodiment, the first path S1 is non-linear such as wavy, and the second path S2 is linear. The direction of the first path S1 is substantially parallel to the light-receiving surface 823 of the light guide plate 820, and the direction of the second path S2 is inclined to the left side relative to the light-receiving surface 823 of the light guide plate 820.

As shown in FIG. 8I, the prisms extend along the first path S1, and each of the microstructure groups extends along the second path S2. In this embodiment, the first path S1 is linear, and the second path S2 is non-linear such as wavy. The direction of the first path S1 is substantially parallel to the light-receiving surface 823 of the light guide plate 820, and the direction of the second path S2 is inclined to the right side relative to the light-receiving surface 823 of the light guide plate 820.

As shown in FIG. 8J, the prisms extend along the first path S1, and each of the microstructure groups extends along the second path S2. In this embodiment, both the first path S1 and the second path S2 are non-linear such as wavy. The direction of the first path S1 is substantially parallel to the light-receiving surface 823 of the light guide plate 820, and the direction of the second path S2 is inclined to the right side relative to the light-receiving surface 823 of the light guide plate 820.

As shown in FIG. 8K, the prisms extend along the first path S1, and each of the microstructure groups extends along the second path S2. In this embodiment, the first path S1 is linear, and the second path S2 is non-linear such as wavy. The direction of the first path S1 is substantially parallel to the light-receiving surface 823 of the light guide plate 820, and the direction of the second path S2 is inclined to the left side relative to the light-receiving surface 823 of the light guide plate 820.

As shown in FIG. 8L, the prisms extend along the first path S1, and each of the microstructure groups extends along the second path S2. In this embodiment, both the first path S1 and the second path S2 are non-linear such as wavy. The direction of the first path S1 is substantially parallel to the light-receiving surface 823 of the light guide plate 820, and the direction of the second path S2 is inclined to the left side relative to the light-receiving surface 823 of the light guide plate 820.

As shown in FIG. 8M, the prisms extend along the first path S1, at least one of the microstructure groups extends along the second path S2, and at least another one of the microstructure groups extends along a third path S3. For example, odd rows of the microstructure groups extend along the second path S2, and even rows of the microstructure groups extends along the third path S3, in which the third path S3 is different from the first path S1 and the second path S2. In this embodiment, the first path S1, the second path S2, and the third path S2 are linear. The direction of the first path S1 is substantially parallel to the light-receiving surface 823 of the light guide plate 820, the direction of the second path S2 is inclined to the left side relative to the light-receiving surface 823 of the light guide plate 820, and the direction of the third path S3 is inclined to the right side relative to the light-receiving surface 823 of the light guide plate 820.

As shown in FIG. 8N, the prisms extend along the first path S1, at least one of the microstructure groups extends along the second path S2, and at least another one of the microstructure groups extends along a third path S3. For example, odd rows of the microstructure groups extend along the second path S2, and even rows of the microstructure groups extends along the third path S3, in which the third path S3 is different from the first path S1 and the second path S2. In this embodiment, the first path S1 is non-linear such as wavy, and the second path S2 and the third path S2 are linear. The direction of the first path S1 is substantially parallel to the light-receiving surface 823 of the light guide plate 820, the direction of the second path S2 is inclined to the left side relative to the light-receiving surface 823 of the light guide plate 820, and the direction of the third path S3 is inclined to the right side relative to the light-receiving surface 823 of the light guide plate 820.

As shown in FIG. 8O, the prisms extend along the first path S1, at least one of the microstructure groups extends along the second path S2, and at least another one of the microstructure groups extends along a third path S3. For example, odd rows of the microstructure groups extend along the second path S2, and even rows of the microstructure groups extends along the third path S3, in which the third path S3 is different from the first path S1 and the second path S2. In this embodiment, the first path S1, the second path S2, and the third path S2 are non-linear such as wavy. The direction of the first path S1 is substantially parallel to the light-receiving surface 823 of the light guide plate 820, the direction of the second path S2 is inclined to the left side relative to the light-receiving surface 823 of the light guide plate 820, and the direction of the third path S3 is inclined to the right side relative to the light-receiving surface 823 of the light guide plate 820.

In conclusion, the backlight module of the embodiment of the present disclosure, by prisms on the bottom surface of light guide plate, directivity of surface light source provided by backlight module can be enhanced. The bottom surface of the light guide surface further includes microstructure groups, which can further enhance uniformity of the foresaid surface light source, or even further enhance the directivity. The manufacturing method of the embodiment of the present disclosure can provide a light guide plate with prisms and microstructure groups.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module comprising:
   a plurality of light-emitting devices; and
   a light guide plate having a light-emitting surface, a bottom surface being disposed opposite to the light-emitting surface, a first light-receiving side connecting the light-emitting surface and the bottom surface, a plurality of prisms, and a plurality of microstructure groups,
   wherein the light-emitting devices are disposed at the first light-receiving side along a first direction, the prisms are disposed on the bottom surface, each of the microstructure groups has a plurality of microstructures, and each of the microstructures interconnects adjacent two of the prisms, wherein each of the prisms has a ridgeline extending along a first path, and at least one of the microstructure groups has a long axis extending along a second path, which is different from the first path.

2. The backlight module of claim 1, wherein at least another one of the microstructure groups has a long axis extending along a third path, which is different from the first path and the second path.

3. The backlight module of claim 1, wherein the first path is linear.

4. The backlight module of claim 1, wherein the second path is linear.

5. The backlight module of claim 1, wherein the first path is non-linear.

6. The backlight module of claim 1, wherein the second path is non-linear.

7. The backlight module of claim 1, wherein a cross-section of each of the microstructures taken along the first direction is a triangle with a sharp angle at top, a triangle with a round angle at top, a rectangle, a trapezoid, a dome, a semi-circle, or a semi-ellipse.

8. The backlight module of claim 1, wherein, in each of the microstructure groups, on normal direction of the light-emitting surface, height of each of the microstructures is higher or lower than heights of two of the prisms adjacent to the microstructure.

9. The backlight module of claim 1, wherein, in each of the microstructure groups, on normal direction of the light-emitting surface, heights of the microstructures are increasing or decreasing along the second path.

10. The backlight module of claim 1, wherein, in every two of the microstructure groups which are adjacently disposed, the microstructures of the microstructure group and the microstructures of the other microstructure group are arranged in an alternative manner.

11. The backlight module of claim 1, wherein, in each of the microstructure groups, some of the microstructures are connected to each other.

12. The backlight module of claim 1, wherein, in each of the microstructure groups, some of the microstructures are disconnected to each other.

13. The backlight module of claim 1, wherein the light guide plate has a first area, a second area, and a third area, and distance between the first area and the first light-receiving side is less than distance between the third area and the first light-receiving side, and distance between the second area and the first light-receiving side is less than the distance between the third area and the first light-receiving side, and the second area is located between the first area and the third area, and a structural height ratio in the first area and a structural height ratio in the third area are less than a structural height ratio in the second area, and the structural height ratio is, in normal direction of the light-emitting surface, maximum value of ratios of height of each of the microstructures to heights of two of the prisms adjacent to the microstructure.

14. The backlight module of claim 1 further comprising:
a plurality of second light-emitting devices;
and the light guide plate further including a second light-receiving side connecting the light-emitting surface and the bottom surface, a first area, a second area, a third area, a fourth area, and a fifth area, wherein the second light-receiving side is disposed opposite to the first light-receiving side, and the second light-emitting devices are disposed at the second light-receiving side along the first direction, and distance between the first area and the first light-receiving side is less than distance between the third area and the first light-receiving side, and the second area is located between the first area and the third area, and distance between the fifth area and the second light-receiving side is less than distance between the third area and the second light-receiving side, and the fourth area is located between the third area and the fifth area, a structural height ratio of the first area and a structural height ratio of the third area are less than a structural height ratio of the second area, and a structural height ratio of the fifth area and the structural height ratio of the third area are smaller than a structural height ratio of the fourth area, and the structural height ratio is, in normal direction of the light-emitting surface, maximum value of ratios of height of each of the microstructures to heights of two of the prisms adjacent to the microstructure.

15. The backlight module of claim 1, wherein the light guide plate includes a middle region and two side regions at opposite sides of the middle region, the prisms and the microstructure groups are disposed at the middle region, and the side regions are free from the prisms and the microstructure groups.

16. The backlight module of claim 15, wherein the first light-receiving side connects the middle region and the side regions.

17. The backlight module of claim 15, wherein the light-emitting surface of each of the side regions is a plane surface.

18. The backlight module of claim 15, wherein the light-emitting surface of each of the side regions is a convex surface.

19. The backlight module of claim 15, wherein the light-emitting surface of the side regions is a concave surface.

20. The backlight module of claim 1, wherein the prisms and the microstructures are protrusions protruding away from the light-emitting surface.

21. The backlight module of claim 1, wherein the prisms and the microstructures are concaves recessing towards the light-emitting surface.

22. The backlight module of claim 1, wherein the prisms are protrusions protruding away from the light-emitting surface, and the microstructures are concaves recessing towards the light-emitting surface.

23. The backlight module of claim 1, wherein the prisms are concaves recessing towards the light-emitting surface, and the microstructures are protrusions protruding away from the light-emitting surface.

* * * * *